US010403449B2

(12) United States Patent
Ka et al.

(10) Patent No.: US 10,403,449 B2
(45) Date of Patent: Sep. 3, 2019

(54) DIRECT-CURRENT CIRCUIT BREAKER

(71) Applicant: MITSUBISHI ELECTRIC CORPORATION, Chiyoda-ku, Tokyo (JP)

(72) Inventors: Shiken Ka, Tokyo (JP); Hiroki Ito, Tokyo (JP); Kunio Kikuchi, Tokyo (JP); Makoto Miyashita, Tokyo (JP); Kazuyori Tahata, Tokyo (JP); Sho Tokoyoda, Tokyo (JP); Kenji Kamei, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 283 days.

(21) Appl. No.: 15/505,173

(22) PCT Filed: Jun. 10, 2015

(86) PCT No.: PCT/JP2015/066748
§ 371 (c)(1),
(2) Date: Feb. 20, 2017

(87) PCT Pub. No.: WO2016/056274
PCT Pub. Date: Apr. 14, 2016

(65) Prior Publication Data
US 2017/0271100 A1 Sep. 21, 2017

(30) Foreign Application Priority Data
Oct. 9, 2014 (WO) .................. PCT/JP2014/077058

(51) Int. Cl.
*H02H 3/20* (2006.01)
*H02H 9/04* (2006.01)
(Continued)

(52) U.S. Cl.
CPC ............... *H01H 9/54* (2013.01); *H01F 27/24* (2013.01); *H01F 38/40* (2013.01); *H01H 9/542* (2013.01);
(Continued)

(58) Field of Classification Search
CPC ...... H01H 33/006; H01H 33/596; H01H 9/54; H02H 3/08
(Continued)

(56) References Cited

U.S. PATENT DOCUMENTS 4,922,364 A * 5/1990 Paulsson .................. H02H 7/16 361/16
5,214,557 A * 5/1993 Hasegawa ............ H01H 33/596 361/11
(Continued)

FOREIGN PATENT DOCUMENTS

JP 54-053270 A 4/1979
JP 57-182923 A 11/1982
(Continued)

OTHER PUBLICATIONS

International Search Report (PCT/ISA/210) dated Sep. 8, 2015, by the Japan Patent Office as the International Searching Authority for International Application No. PCT/JP2015/066748.
(Continued)

*Primary Examiner* — Thienvu V Tran
*Assistant Examiner* — Lucy M Thomas
(74) *Attorney, Agent, or Firm* — Buchanan Ingersoll & Rooney PC

(57) ABSTRACT

A direct-current circuit includes: a breaker that is inserted into the direct-current line and becomes a path for direct current when in a steady state; a resonance circuit connected in parallel with the breaker and superimposing resonance current on the direct current; and a first disconnector and a second disconnector connected to first and second connection points of the breaker and the resonance circuit, respectively, and forming a path for the direct current together with the breaker. The resonance circuit includes a series circuit that includes a capacitor and a reactor and generates the
(Continued)

resonance current, a charging resistor for charging the capacitor with a direct-current potential of the direct-current line, a high-speed switch connected in series with the series circuit on the capacitor side and superimposing the resonance current on the direct current, and an arrester connected in parallel with the capacitor and the high-speed switch.

21 Claims, 19 Drawing Sheets

(51) Int. Cl.

| | |
|---|---|
| ***H01H 9/54*** | (2006.01) |
| ***H01F 27/24*** | (2006.01) |
| ***H01F 38/40*** | (2006.01) |
| ***H01H 33/59*** | (2006.01) |
| ***H01H 33/66*** | (2006.01) |
| ***H01H 71/24*** | (2006.01) |
| ***H01H 89/00*** | (2006.01) |
| ***H01H 9/56*** | (2006.01) |

(52) U.S. Cl.
CPC ............ *H01H 9/56* (2013.01); *H01H 33/596* (2013.01); *H01H 33/66* (2013.01); *H01H 71/24* (2013.01); *H01H 89/00* (2013.01); *H01H 2009/543* (2013.01)

(58) Field of Classification Search
USPC ........................................................ 361/93.1
See application file for complete search history.

(56) References Cited

U.S. PATENT DOCUMENTS 5,737,162 A 4/1998 Ito et al.
2001/0029433 A1* 10/2001 Scott .................... G01R 31/025 702/58
2013/0020881 A1* 1/2013 Panousis .............. H01H 33/596 307/113
2013/0335861 A1 12/2013 Laschinski et al.
2016/0322178 A1* 11/2016 Park ......................... H01H 9/30

FOREIGN PATENT DOCUMENTS

| | | | |
|---|---|---|---|
| JP | 57-187818 | A | 11/1982 |
| JP | 59-54132 | A | 3/1984 |
| JP | 63-188843 | U | 12/1988 |
| JP | 02-056332 | U | 4/1990 |
| JP | 05-089753 | A | 4/1993 |
| JP | 09-50743 | A | 2/1997 |
| JP | 11-111123 | A | 4/1999 |
| JP | 2002-110006 | A | 4/2002 |
| JP | 2004-288478 | A | 10/2004 |
| JP | 2005-190671 | A | 7/2005 |
| JP | 2006-032077 | A | 2/2006 |
| JP | 2011-175925 | A | 9/2011 |
| JP | 2014-509396 | A | 4/2014 |

OTHER PUBLICATIONS

Written Opinion (PCT/ISA/237) dated Sep. 8, 2015, by the Japan Patent Office as the International Searching Authority for International Application No. PCT/JP2015/066748.
Office Action (Notification of Reasons for Refusal) dated Mar. 1, 2016, by the Japanese Patent Office in corresponding Japanese Patent Application No. 2015-556288, and an English Translation of the Office Action. (12 pages).
Office Action (Notification of Reasons for Refusal) dated Jul. 12, 2016, by the Japanese Patent Office in corresponding Japanese Patent Application No. 2015-556288, and an English Translation of the Office Action. (6 pages).

* cited by examiner

DIRECT-CURRENT CIRCUIT BREAKER

FIELD

The present invention relates to a direct-current circuit breaker that interrupts a direct current.

BACKGROUND

Direct-current circuit breakers that interrupt a direct current create a current zero point by superimposing a resonance current from a resonance circuit composed of a capacitor and a reactor and thus interrupt the direct current at the current zero point. Examples of conventional direct-current circuit breakers include the direct-current circuit breaker disclosed in Patent Literature 1. The direct-current circuit breaker disclosed in Patent Literature 1 includes a charging circuit that is used for charging the capacitor of the resonance circuit described above and that is composed of an alternating-current power supply and a rectifier, and the capacitor is pre-charged by the charging circuit. If a fault occurs, the charge accumulated in the capacitor is discharged and thus the resonance current is superimposed on the direct current so as to create a current zero point.

CITATION LIST

Patent Literature

Patent Literature 1: Japanese Patent Application Laid-open No. 2006-32077

SUMMARY

Technical Problem

With the conventional direct-current circuit breaker described above, however, it is necessary to additionally provide an alternating-current power supply and a charging circuit for charging the capacitor of the resonance circuit; therefore, a problem arises in that the size and cost of the apparatus increases. Moreover, it is difficult to interrupt a direct current within a time period as short as ten and several milliseconds. Furthermore, when a bipolar configuration is used for direct-current transmission, if a ground fault occurs in one pole, the resonance circuit on the normal side is not sufficiently protected.

The present invention has been achieved in view of the above and an object of the present invention is to provide a direct-current circuit breaker that can have reduced size and cost and that can offer an improved performance.

Solution to Problem

In order to solve the above problems and achieve the object, an aspect of the present invention is a direct-current circuit breaker that creates a current zero point by superimposing a resonance current on a direct current flowing along a direct-current line and interrupts the direct current at the current zero point. The direct-current circuit breaker includes: a breaker that is inserted into the direct-current line and becomes a path for the direct current when in a steady state; a resonance circuit that is connected in parallel with the breaker and superimposes a resonance current on the direct current after the breaker is opened; a first disconnector that is connected at one end to a first connection point of the breaker and the resonance circuit and that forms a path for the direct current together with the breaker when in a steady state; and a second disconnector that is connected at one end to a second connection point of the breaker and the resonance circuit and that forms a path for the direct current together with the breaker and the first disconnector when in a steady state. The resonance circuit includes a series circuit that includes a capacitor and a reactor and generates the resonance current, a charging resistor that is used for charging the capacitor with a direct-current potential of the direct-current line when in a steady state, a high-speed switch that is connected in series with the series circuit on the capacitor side and superimposes the resonance current on the direct current after the breaker is opened, and an arrester that is connected in parallel with the capacitor and the high-speed switch and that limits a current flowing into the capacitor from the direct-current line.

Advantageous Effects of Invention

According to the present invention, an effect is obtained where the direct-current circuit breaker can have reduced size and cost and can offer an improved interruption performance.

DESCRIPTION OF EMBODIMENTS

Exemplary embodiments of a direct-current circuit breaker according to the present invention will be explained below in detail with reference to the drawings. This invention is not limited to the embodiments.

First Embodiment

Figure 1:
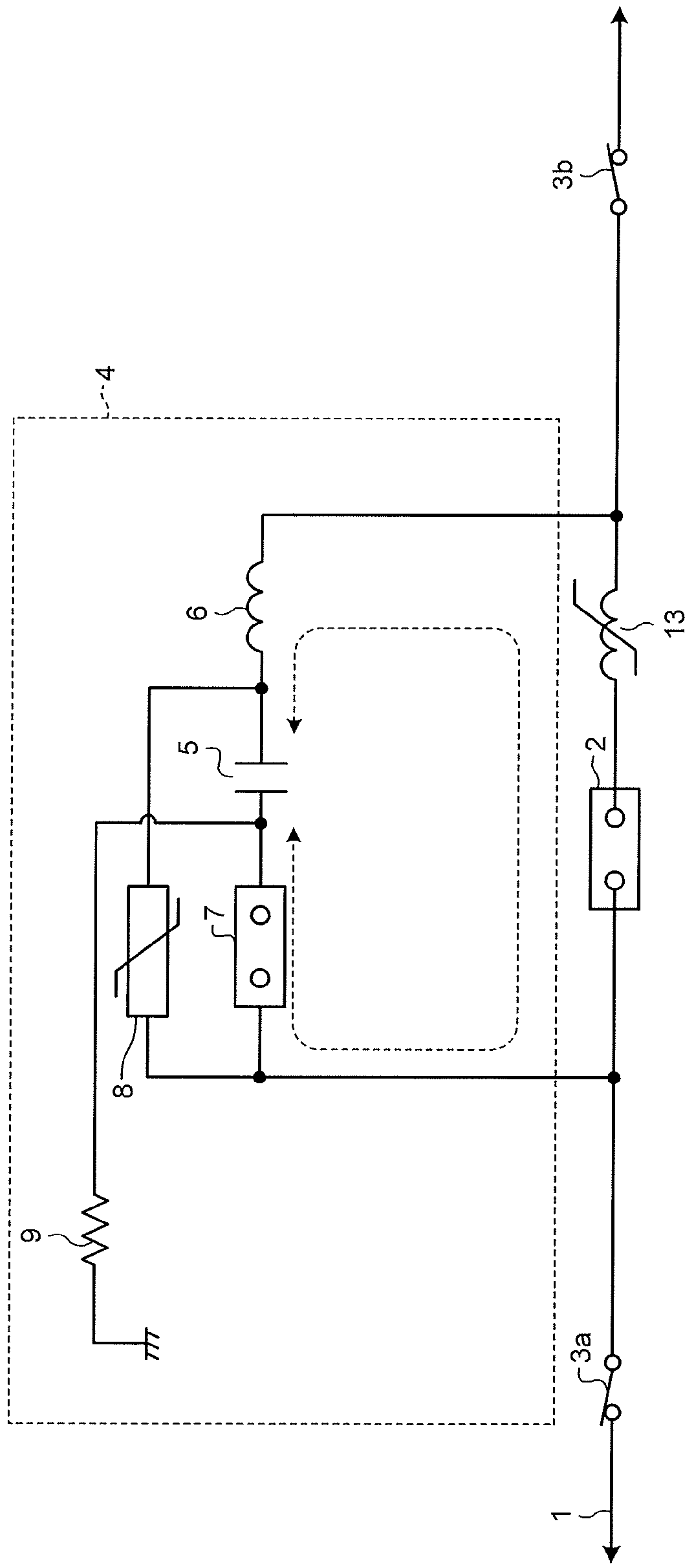
FIG. 1 is a diagram illustrating an example configuration of a direct-current circuit breaker according to a first embodiment.

FIG. 1 is a diagram illustrating an example configuration of a direct-current circuit breaker according to a first embodiment. As illustrated in FIG. 1, the direct-current circuit breaker according to the first embodiment is inserted into a direct-current line 1. The direct-current circuit breaker includes a disconnector 3*a*; a breaker 2; an iron-core reactor 13; a disconnector 3*b*; and a resonance circuit 4. The disconnector 3*a*, the breaker 2, the iron-core reactor 13, and the disconnector 3*b* form a path along which a direct current flows when in a steady state. The resonance circuit 4 superimposes a resonance current after the breaker 2 is opened. Each of the disconnector 3*a* and the disconnector 3*b* has a function as a disconnector; however, they may each have a function as a circuit breaker not as a disconnector. The configuration without the iron-core reactor 13 can still have the performance necessary for solving the above problems.

The resonance circuit 4 includes a series circuit that includes a capacitor 5 and a reactor 6; a high-speed switch 7 for connecting the breaker 2 and the series circuit in parallel with each other after the breaker 2 is opened; a charging resistor 9 for charging the capacitor 5 with the direct-current potential of the direct-current line 1 when in a steady state; and an arrester 8 connected in parallel with a series circuit that includes the capacitor 5 and the high-speed switch 7.

The high-speed switch 7 has a resonance-current injecting function in order to superimpose a resonance current on the direct current flowing along the direct-current line 1. In the operation of closing the gap between the electrodes of the high-speed switch 7, the high-speed switch 7 stops the movable electrode such that it is in contact with the stationary electrode or it is out of contact with the stationary electrode. In a state where the movable electrode is stopped such that it is out of contact with the stationary electrode, i.e., the movable electrode is stopped at a position where it is not in contact with the stationary electrode, the gap between the movable electrode and the stationary electrode is closed by causing a discharge across the gap and thereby electrically connecting the electrodes. In the operation of closing the gap between the electrodes, by causing the movable electrode to stop at a position where it is not in contact with the stationary electrode, the electrode surface can be prevented from being degraded due to the contact with the contact electrode. This improves the durability of the electrode surface. Examples of the high-speed switch 7 include a switch that does not include a movable part and that is closed by causing a discharge across the air gap.

The current that flows in the resonance circuit 4 when the high-speed switch 7 is closed, i.e., when the gap between the electrodes is closed, is limited by the arrester 8. The arrester 8 is, for example, a metal-oxide varistor arrester. The arrester 8 has a capacity sufficient to prevent an overvoltage from being applied across the capacitor 5 and to absorb a fault current.

Next, an explanation will be given, with reference to FIG. 1 to FIG. 7, of an operation performed when the direct-current circuit breaker according to the present embodiment interrupts a direct current.

Figure 2:
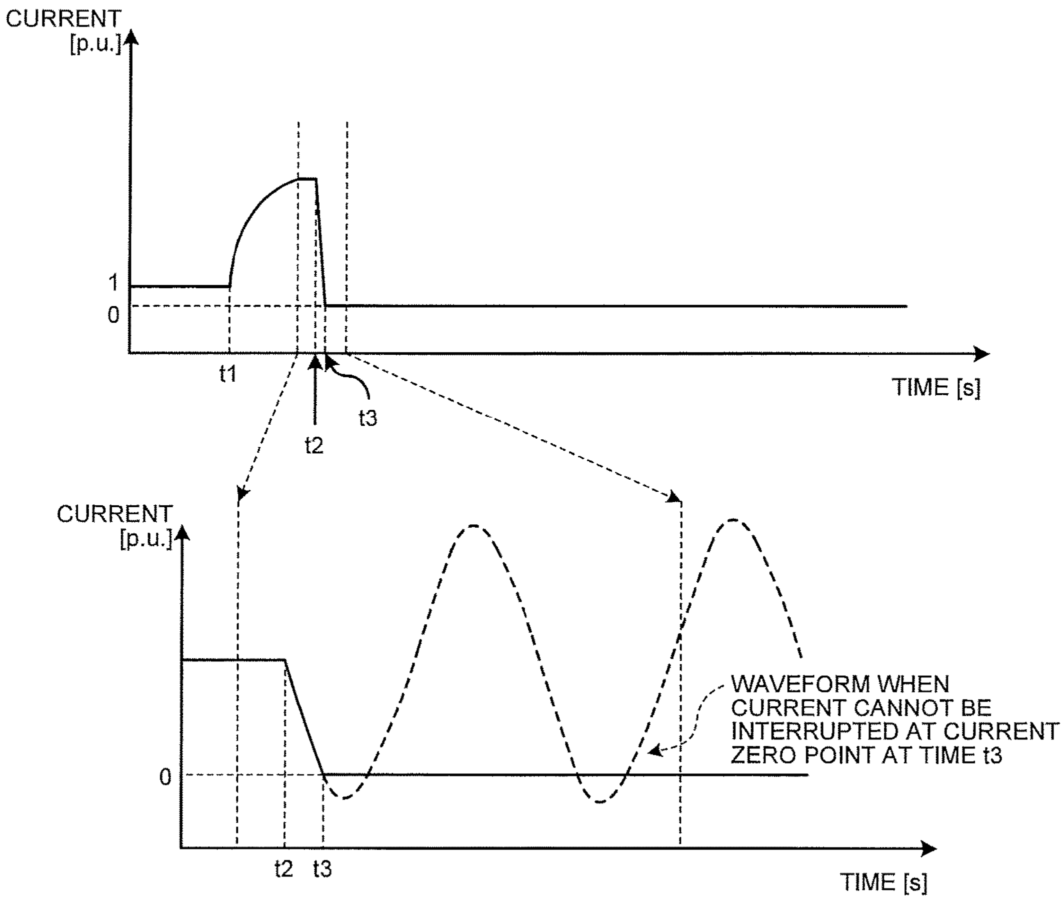
FIG. 2 is a diagram illustrating an example of a direct-current interruption operation performed by the direct-current circuit breaker according to the first embodiment.

FIG. 2 is a diagram illustrating an example of a direct-current interruption operation when a resonance current of opposite polarity is superimposed on the direct current flowing in the direct-current circuit breaker according to the present embodiment. FIG. 2 illustrates an example operation when a current of 1 p.u. (Per Unit) flows along the direct-current line 1 illustrated in FIG. 1 from the disconnector 3*a* side toward the disconnector 3*b* side when in a steady state. When in a steady state, the capacitor 5 is charged with the direct-current potential of the direct-current line 1 via the charging resistor 9 and with the time constant. Moreover, when in a steady state, the breaker 2 and the disconnectors 3*a* and 3*b* are closed and the high-speed switch 7 is open.

Figure 3:
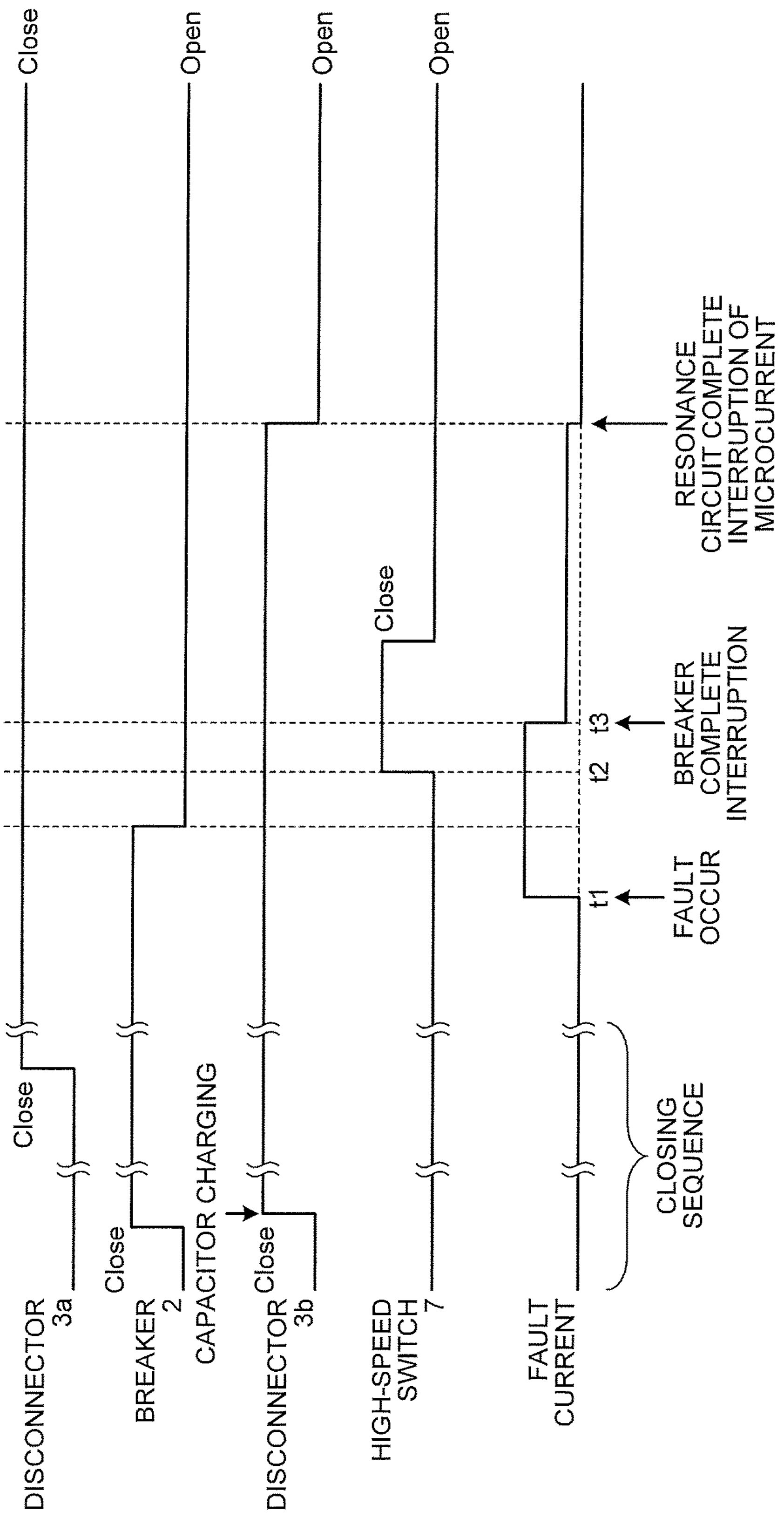
FIG. 3 is a timing chart illustrating an example of the operation timing of each unit in the direct-current circuit breaker according to the first embodiment.

FIG. 3 is a timing chart illustrating an example of the operation timing of each unit in the direct-current circuit breaker according to the present embodiment. FIG. 3 illustrates the operation timing of each unit when the operation illustrated in FIG. 2 is performed.

For example, at time t1 illustrated in FIG. 2, when a fault occurs in the direct-current line 1 illustrated FIG. 1 (for example, when a ground fault occurs on the disconnector 3*b* side), the breaker 2 on the direct-current line 1 receives a fault current that is determined in accordance with the circuit conditions up to the fault point and the value of the ground resistance and that is a few times the current when in a steady state (1 p.u.). At time t1, the capacitor 5 is completely charged.

When a fault occurs in the direct-current line 1, the direct-current circuit breaker in the present embodiment starts an opening operation of the breaker 2. Thereafter, at time t2, the high-speed switch 7 is closed. At time t2, the opening operation of the breaker 2 does not have to be completely finished. In the present embodiment, it is assumed that the opening operation of the breaker 2 has not been completely finished at time t2 and at time t3, which will be described later. When the high-speed switch 7 is closed, the capacitor 5 that is fully charged with the direct-current potential of the direct-current line 1 discharges the charge, and, as indicated by a broken line in FIG. 1, a resonance current flows around the loop made up of the capacitor 5, the reactor 6, the breaker 2, and the high-speed switch 7. When the resonance current is superimposed on the fault current flowing along the direct-current line 1 and the current zero point is created at time t3 as illustrated in FIG. 2, an arc between the electrodes of the breaker 2 that is still performing the opening operation is extinguished and thus the current is interrupted. The overvoltage generated when the breaker 2 is opened is limited by the arrester 8.

When the breaker 2 is opened and moreover the arc between the electrodes is extinguished at time t3, interruption of the fault current by the breaker 2 is completed and the fault current flows in the resonance circuit 4. The fault current is limited by the arrester 8 of the resonance circuit 4. However, as illustrated also in FIG. 3, a microcurrent continues to flow along the direct-current line 1. Thus, the direct-current circuit breaker opens the disconnector 3*b* so as to remove the microcurrent. With the above operation, the microcurrent is interrupted and thus the fault current is completely interrupted. Here, the disconnector 3*b* is opened to interrupt the microcurrent; however, the microcurrent can still be interrupted by opening the disconnector 3*a* instead of the disconnector 3*b*. Alternatively, the microcurrent may be interrupted by opening both the disconnector 3*a* and the disconnector 3*b* together.

After the high-speed switch 7 is closed with the occurrence of a fault, the high-speed switch 7 may be maintained in a closed state. However, after interruption of the fault current by the breaker 2 is completed, the high-speed switch 7 may be returned to the open state. For example, after the fault current is completely interrupted, in a state where a voltage remains in the capacitor 5 that is a voltage equivalent to the initial charging voltage, which is the charging voltage of the capacitor 5 before a fault occurs, the high-speed switch 7 is returned to the open state. Consequently, the capacitor 5 stops discharging the charge and thus the charge can continue to be accumulated in the capacitor 5. Because the charge is accumulated in the capacitor 5, it is possible to shorten the time required for reclosing the direct-current circuit breaker, i.e., the charging time of the capacitor 5 necessary before the direct-current circuit breaker is closed. Consequently, the direct-current circuit breaker can be promptly reclosed. When the high-speed switch 7 is returned to the open state after interruption of the fault current by the breaker 2 is completed, because the microcurrent is interrupted, it is not necessary to open one or both of the disconnectors 3*a* and 3*b*. An explanation will be given below of a case where the high-speed switch 7 is returned to the open state after interruption of the fault current by the breaker 2 is completed.

Figure 4:
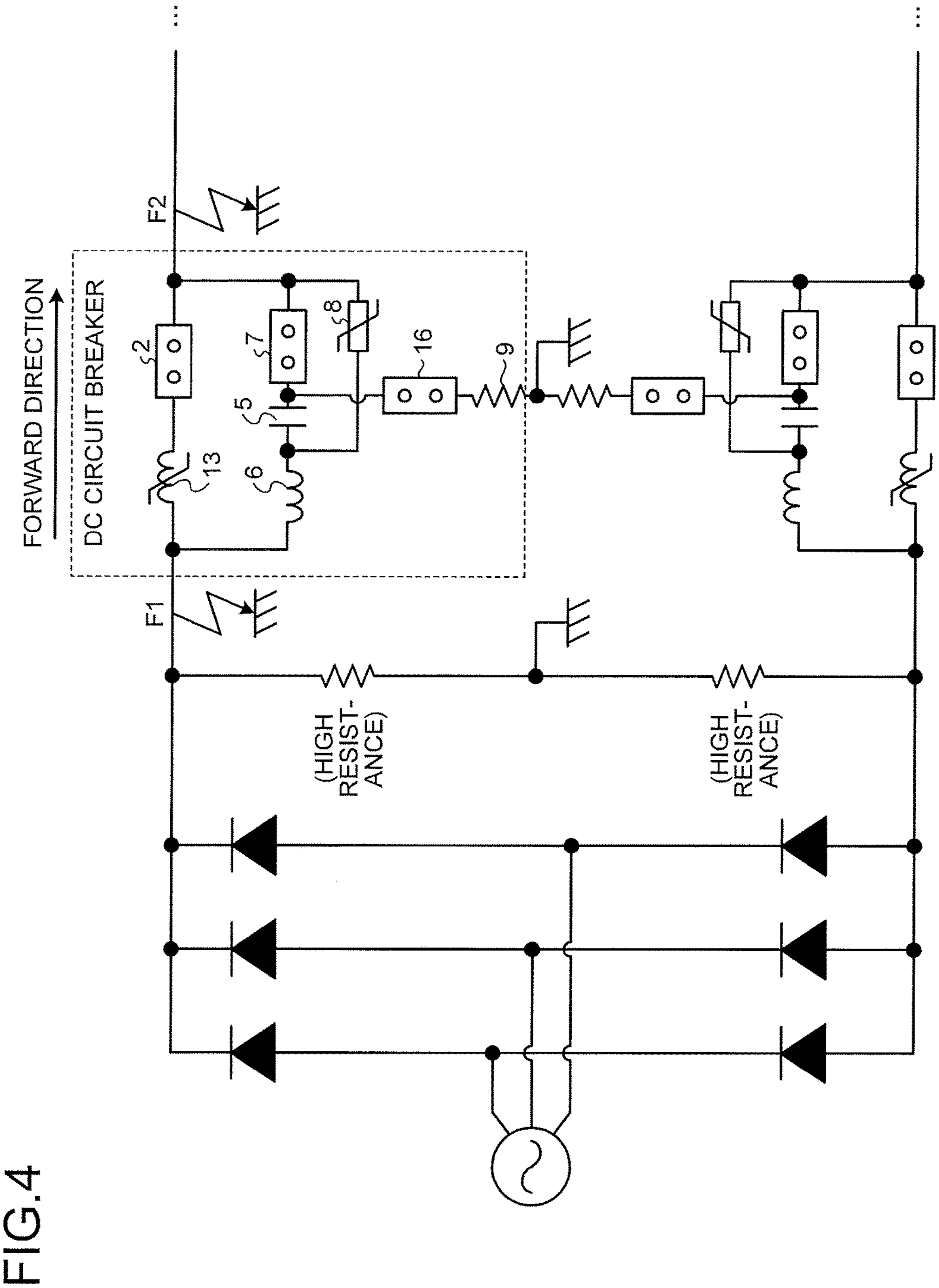
FIG. 4 is a diagram illustrating an example where the direct-current circuit breaker according to the first embodiment is applied to a system.

FIG. 4 is a diagram illustrating an example where the direct-current circuit breaker according to the first embodiment is applied to a system. In the following explanation, the direction of the illustrated arrow represents a forward direction in which a current flows during normal conditions. In FIG. 4, some of the components of the direct-current circuit breaker are not illustrated. When the example of application illustrated in FIG. 4 is used, it is necessary to provide the direct-current circuit breaker with a disconnector 16. After a fault current is interrupted by opening the breaker 2, when the high-speed switch 7 is returned to the open state, the direct-current circuit breaker opens the high-speed switch 7 in the time region in which transient oscillations of the inter-electrode voltage of the breaker 2 converge such that the voltage becomes a direct-current recovery voltage, i.e., a constant voltage. Consequently, a voltage equivalent to the system voltage remains in the capacitor 5. In such a state, the disconnector 16 is opened so as to prevent the residual charge in the capacitor 5 from being discharged to the ground. Thus, it is possible to keep the capacitor 5 charged. The disconnector 16 is opened at least before the direct-current circuit breaker in the system is reclosed by reclosing the breaker 2. An explanation will be given below in detail of an operation separately in a case where the fault point is F1 and a case where the fault point is F2 in FIG. 4.

(Fault Occurs at Point F1)

Figure 5:
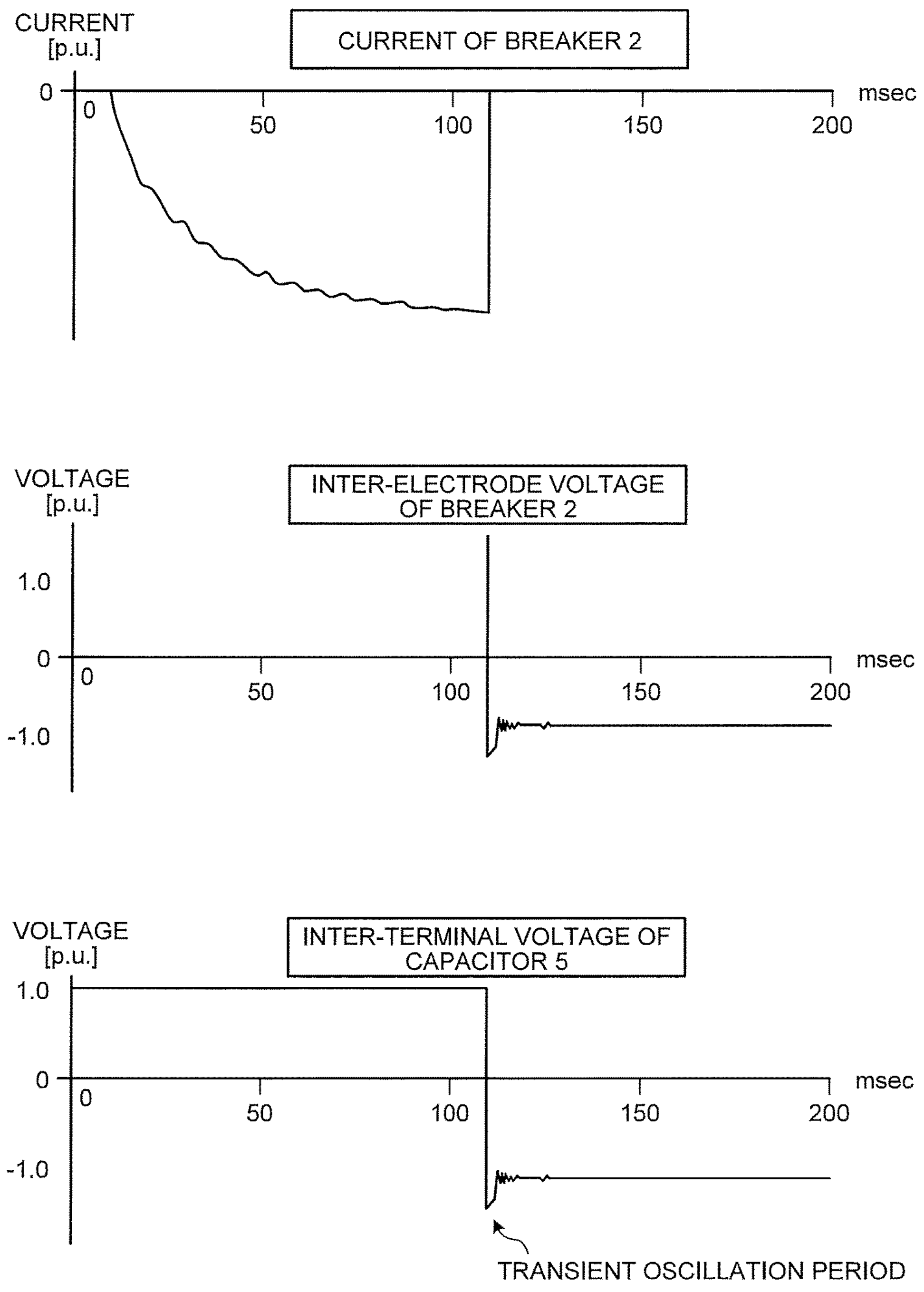
FIG. 5 is a diagram illustrating a current waveform and voltage waveforms in the units that make up the direct-current circuit breaker when a fault occurs.

FIG. 5 illustrates a current waveform and voltage waveforms in the units that make up the direct-current circuit breaker when a fault current is interrupted with the occurrence of a fault at point F1. In the example illustrated in FIG. 5, as illustrated in the upper portion, the fault current flowing in the breaker 2 is completely interrupted after a lapse of 100 milliseconds. In other words, the fault current is interrupted by opening the breaker 2 and closing the high-speed switch 7. In this case, as illustrated in the lower portion in FIG. 5, after the fault current is interrupted, the polarity of the inter-terminal voltage of the capacitor 5 is reversed from that of the initial charging state, which is a voltage before the high-speed switch 7 is closed after the detection of the fault. The high-speed switch 7 is opened and the disconnector 16 is opened in the time region that is after the transient oscillation period of the inter-terminal voltage of the capacitor 5 illustrated in the lower portion ends and that is after the inter-terminal voltage converges to a voltage equivalent to the system voltage.

The terminal voltage on the reactor 6 side of the capacitor 5 before a fault occurs at point F1 is equivalent to the system voltage (=+1.0 p.u.); however, because the terminal voltage becomes the ground potential at the same time as the occurrence of the fault, the terminal voltage on the reactor 6 side changes to zero. At this point in time, the inter-terminal voltage of the capacitor 5 remains at the initial charging voltage (+1.0 p.u.); therefore, the other terminal voltage, i.e., the terminal voltage on the high-speed switch 7 side of the capacitor 5, changes from 0 to −1.0 p.u. with reference to the terminal voltage on the reactor 6 side. In such a state, the high-speed switch 7 is closed, whereby the resonance current of opposite polarity is superimposed on the fault current flowing in the breaker 2 and thus the zero point is created in the inter-electrode current of the breaker 2, thereby interrupting the fault current. When the breaker 2 after interrupting the fault current is open, the terminal voltage on the point F1 side of the breaker 2 is 0 and the other terminal voltage is +1.0 p.u. Thus, the terminal voltage of the capacitor 5 is 0 on the reactor 6 side and is +1.0 p.u. on the high-speed switch 7 side, which is opposite in polarity to that before the fault current is interrupted, because the voltage having a reversed polarity remains in the capacitor 5.

If it is assumed that the potential at point F1 recovers to +1.0 p.u. after the breaker 2 is reclosed, the terminal voltage on the reactor 6 side of the capacitor 5 sharply increases to +1.0 p.u., and the terminal voltage on the high-speed switch 7 side sharply increases to +2.0 p.u. after the breaker 2 is reclosed. However, because the path for charging and discharging the capacitor 5 is discontinued by the high-speed switch 7 and the disconnector 16 being opened, the inter-terminal voltage of the capacitor 5 remains at −1.0 p.u. This residual voltage of −1.0 p.u. of the capacitor 5 is used the next time a fault current is interrupted. Consequently, the direct-current circuit breaker can be promptly reclosed. After the breaker 2 is reclosed, the disconnector 16 is closed.

(Fault Occurs at Point F2)

Figure 6:
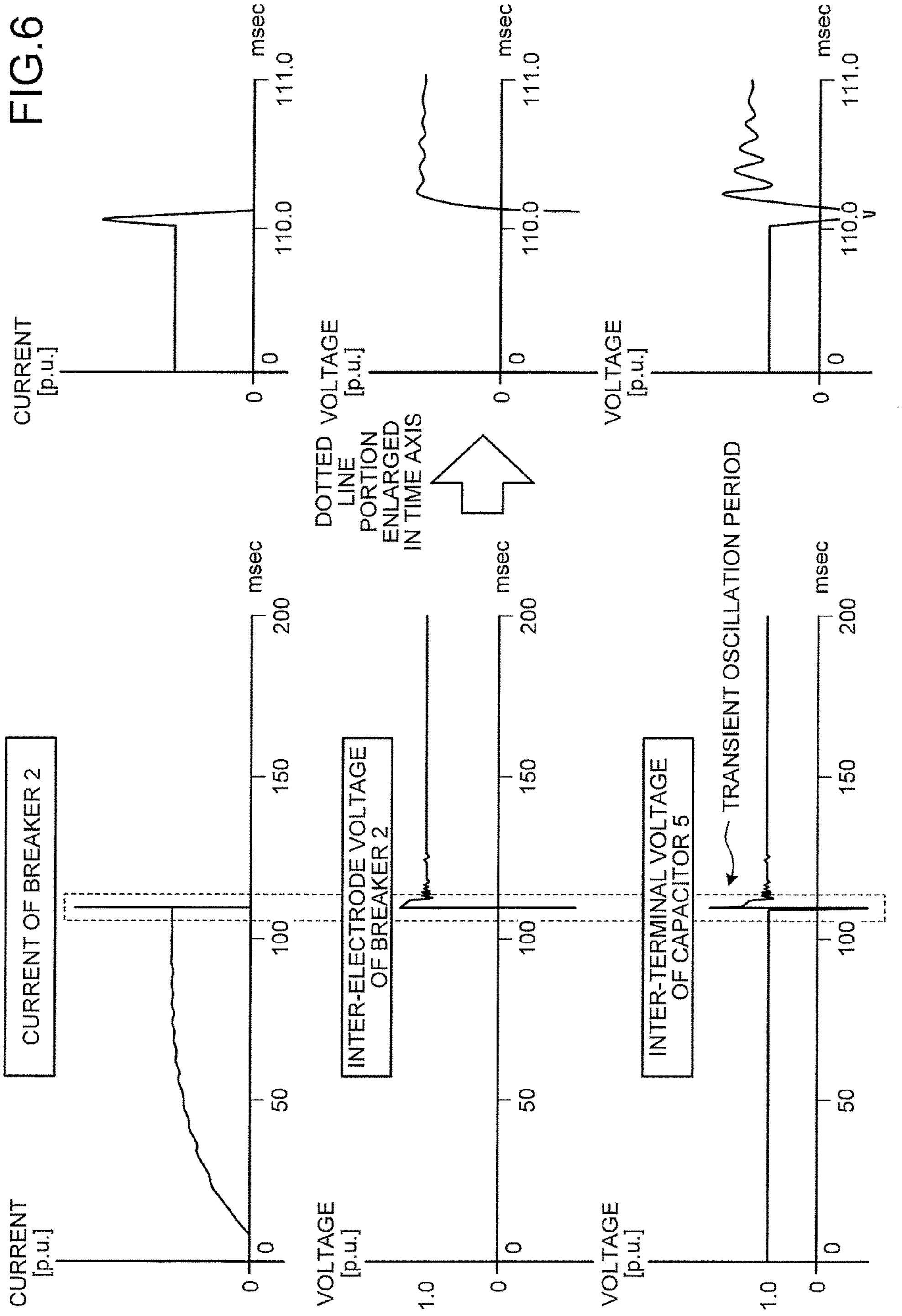
FIG. 6 is a diagram illustrating a current waveform and voltage waveforms in the units that make up the direct-current circuit breaker when a fault occurs.
Figure 7:
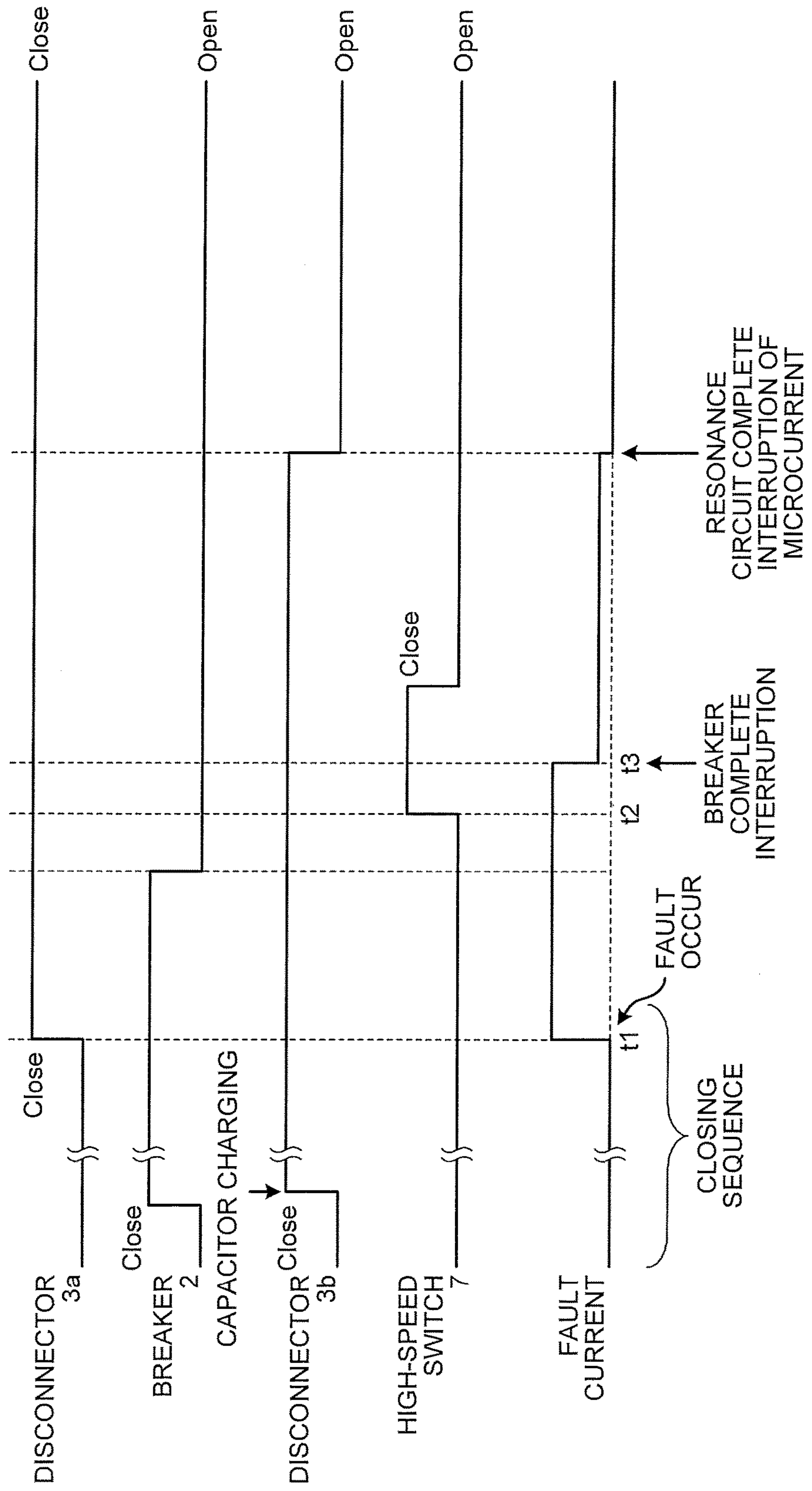
FIG. 7 is a timing chart illustrating an example of the operation timing of each unit in the direct-current circuit breaker when a fault occurs.

FIG. 6 illustrates a current waveform and voltage waveforms in the units that make up the direct-current circuit breaker when a fault current is interrupted with the occurrence of a fault at point F2. In a similar manner to the example illustrated in FIG. 5, the fault current flowing in the breaker 2 is completely interrupted after a lapse of 100 milliseconds. In this case, as illustrated in the lower portion of FIG. 6, the inter-terminal voltage of the capacitor 5 after the fault current is interrupted has the same polarity as the initial charging state. In a similar manner to the case where a fault occurs at point F1 described above, the high-speed switch 7 is opened and the disconnector 16 is opened in the time region that is after the transient oscillation period of the inter-terminal voltage of the capacitor 5 illustrated in the lower portion ends and that is after the inter-terminal voltage converges to a voltage equivalent to the system voltage.

The terminal voltage on the reactor 6 side of the capacitor 5 before a fault occurs at point F2 is equivalent to the system voltage (=+1.0 p.u.); however, because the terminal voltage becomes the ground potential at the same time as the occurrence of the fault, the terminal voltage on the reactor 6 side changes to zero. At this point in time, the inter-terminal voltage of the capacitor 5 remains at the initial charging voltage (+1.0 p.u.); therefore, in a similar manner to the case where a fault occurs at point F1 described above, the other terminal voltage, i.e., the terminal voltage on the high-speed switch 7 side, changes from 0 to −1.0 p.u. In such a state, the high-speed switch 7 is closed, whereby the resonance current of forward polarity is superimposed on the fault current flowing in the breaker 2 and thus the zero point is created in the inter-electrode current of the breaker 2, thereby interrupting the fault current. When the breaker 2 after interrupting the fault current is open, the terminal voltage on the point F2 side of the breaker 2 is 0 and the other terminal voltage is +1.0 p.u. Thus, the terminal voltage of the capacitor 5 is +1.0 p.u. on the reactor 6 side and is 0 on the high-speed switch 7 side because the voltage of the same polarity as the initial charging state remains in the capacitor 5.

In this case, the capacitor 5 is separated from the terminal on the point F2 side of the breaker 2 by the high-speed switch 7; therefore, even if it is assumed that the potential at point F2 recovers to +1.0 p.u. after the breaker 2 is reclosed, the terminal voltage across both terminals of the capacitor 5 does not change. This residual voltage of +1.0 p.u. of the capacitor 5 is used the next time a fault current is interrupted. Consequently, the direct-current circuit breaker can be promptly reclosed. After the breaker 2 is reclosed, the disconnector 16 is closed.

Next, an explanation will be given of a sequence when the direct-current circuit breaker according to the present embodiment on the direct-current line 1 is closed. When the direct-current circuit breaker on the direct-current line 1 is closed and a fault current is interrupted, it is necessary that the capacitor 5 has already been charged at the point in time when a fault occurs. Thus, when the direct-current circuit breaker according to the present embodiment is closed, the breaker 2 is closed in a state where the disconnector 3*a* and the disconnector 3*b* are opened in advance. Thereafter, the disconnector 3*b* is closed so as to charge the capacitor 5. After the capacitor 5 is completely charged, the disconnector 3*a* that is not closed, i.e., in the open state, is closed, thereby closing the direct-current circuit breaker on the direct-current line 1. Thus, the interruption operation can be performed even immediately after the direct-current circuit breaker is closed. As illustrated in the time chart in FIG. 7, even if a fault occurs immediately after the direct-current circuit breaker is closed, the breaker 2 can be immediately opened. In other words, even if a fault occurs immediately after the direct-current circuit breaker is closed, the fault current can be immediately interrupted.

Moreover, because the arrester 8 is installed at the position illustrated in FIG. 1, the voltage to ground can be prevented from being applied to the arrester 8 when in a steady state. In other words, the load on the arrester 8 can be reduced by employing the configuration in which the arrester 8 is connected in parallel with the series circuit that includes the capacitor 5 and the high-speed switch 7. An explanation will be given below as to why this is the case.

The arrester 8 is a non-linear resistor connected to mitigate the overvoltage appearing across the terminals of each of the capacitor 5 and the breaker 2. When a voltage is not applied across the terminals, the arrester 8 functions as a high-resistance resistor. When a voltage is applied across the terminals of the arrester 8, a leakage current starts to flow as the applied voltage increases. When the applied voltage becomes higher than or equal to a certain threshold, the resistance of the arrester 8 decreases sharply and thus the arrester 8 becomes a good conductor. Consequently, the energy of the overvoltage is converted to the current that flows in the arrester 8; therefore, the overvoltage across the terminals of the arrester 8 is reduced and the overvoltage appearing across the terminals of each of the capacitor 5 and the breaker 2 is also reduced. However, when the direct-current circuit breaker is used, it is sometimes necessary that the threshold of the voltage applied across the terminals of the arrester 8 illustrated in FIG. 1, i.e., the voltage value at which the resistance decreases sharply, should be relatively close to the charging voltage of the capacitor 5. In other words, it is sometimes necessary to reduce the difference between the overvoltage that should be reduced by the arrester 8 and the terminal voltage of the capacitor 5. In such a case, if the arrester 8 is directly connected in parallel with the capacitor 5 and the charging voltage is continuously applied to the capacitor 5 for a long period of time, because the same voltage is also applied to the arrester 8, some leakage current continues to flow to the arrester 8. Thus, thermal energy accumulates in the arrester 8, which at worst results in a breakage of the arrester 8 due to overloading. To solve this problem, in the direct-current circuit breaker in the present embodiment, the arrester 8 is connected in parallel with the series circuit of the capacitor 5 and the high-speed switch 7. With such a configuration in which the arrester 8 is connected in parallel with the capacitor 5 and the high-speed switch 7, the high-speed switch 7 is open and the breaker 2 is closed during normal conditions; therefore, it is possible to always keep the capacitor 5 charged and to prevent a voltage from being always applied to the arrester 8.

Figure 8:
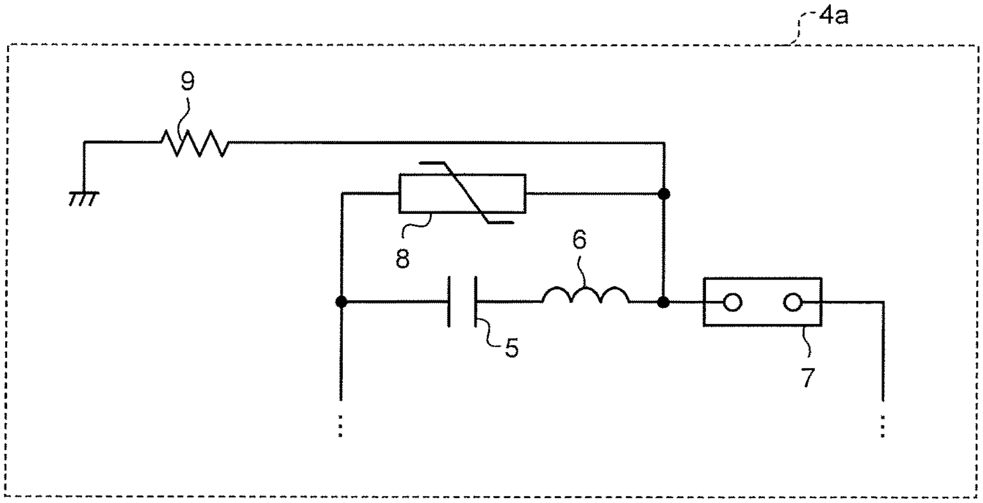
FIG. 8 is a diagram illustrating a modification of a resonance circuit.
Figure 9:
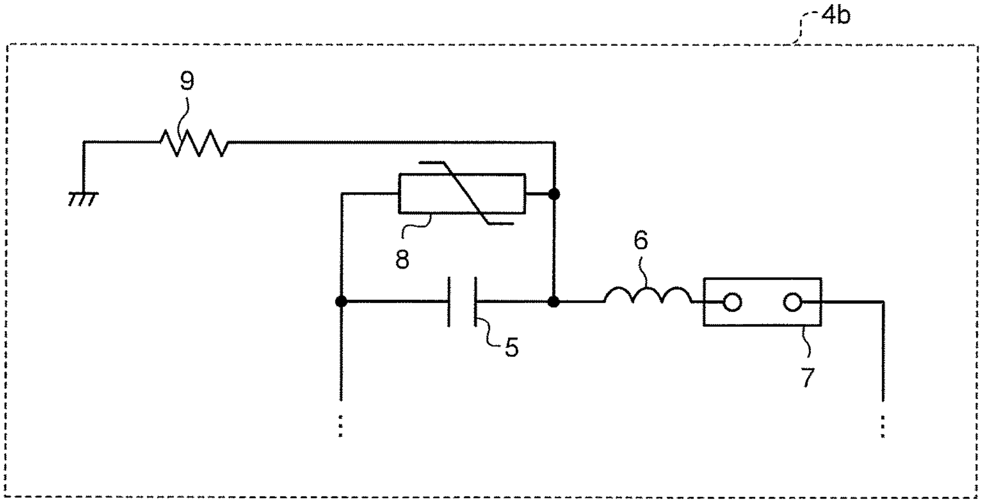
FIG. 9 is a diagram illustrating a modification of the resonance circuit.

The installation position of the arrester 8 is not limited to that illustrated in FIG. 1. If the value of the voltage continuously applied to the arrester 8 does not pose any problem, for example, if the difference between the voltage applied to the arrester 8 and the voltage at which a current starts to flow is large, the installation position of the arrester 8 may be changed to the position illustrated in FIG. 8 or FIG. 9. Even if the resonance circuit 4 illustrated in FIG. 1 is replaced by a resonance circuit 4*a* illustrated in FIG. 8 or a resonance circuit 4*b* illustrated in FIG. 9, the performance required for the direct-current circuit breaker in the present embodiment can be obtained.

Each of the breaker 2, the disconnectors 3*a* and 3*b*, and the high-speed switch 7 used is of a gas type or a vacuum type in which a vacuum valve is provided, or the breaker 2, the disconnectors 3*a* and 3*b*, and the high-speed switch 7 of different types may be combined. Specifically, the configuration may be such that a gas-type device and a vacuum-type device are combined in one direct-current circuit breaker. It is needless to say that they can be of the same type.

Figure 10:
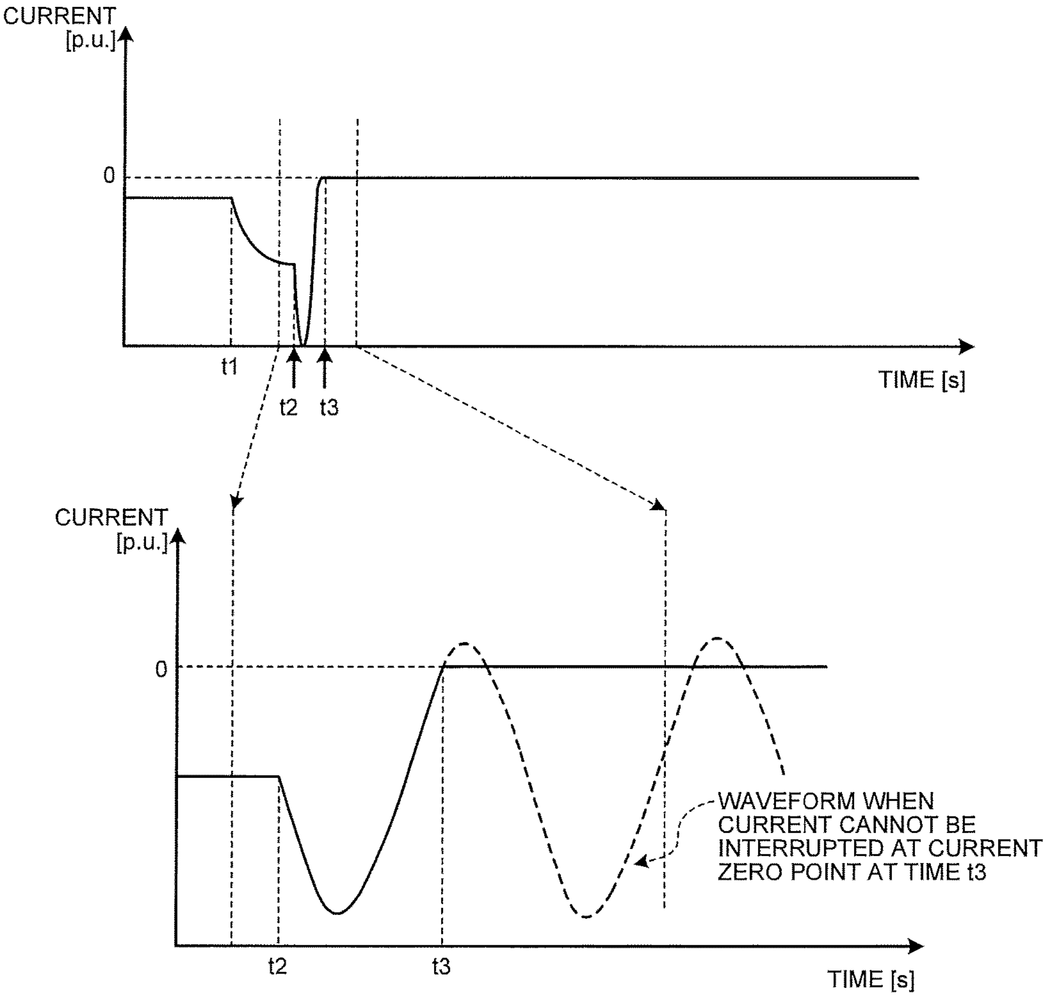
FIG. 10 is a diagram illustrating an example operation of interrupting a direct current performed by the direct-current circuit breaker according to the first embodiment.

When a ground fault occurs on the disconnector 3*a* side of the direct-current line 1 in FIG. 1, as described above, after the ground fault is detected, the breaker 2 is opened and the high-speed switch 7 is closed. As a result, a resonance current is superimposed on the fault current flowing along the direct-current line 1. However, immediately after the capacitor 5 starts discharging the accumulated charge, the polarity of the resonance current superimposed on the fault current becomes the same as that of the fault current flowing along the direct-current line 1 through the breaker 2. FIG. 10 is a diagram illustrating an example operation of interrupting a direct current when a ground fault occurs on the disconnector 3*a* side of the direct-current line 1. As illustrated in FIG. 10, when a ground fault occurs on the disconnector 3*a* side of the direct-current line 1, the current does not cross the zero point during the period of time from when the capacitor 5 starts discharging to when the resonance current hits a first peak and the current crosses the zero point when the current next oscillates to the side opposite to the fault current, and the current of the breaker 2 is interrupted at time t3 illustrated in FIG. 10. The resonance current attenuates due to the internal resistance of the resonance circuit 4. Thus, the values of the capacitance and the inductance of the capacitor 5 and the reactor 6 from which the resonance circuit 4 is configured are determined such that the current crosses the current zero point even if the resonance current attenuates.

Furthermore, the direct-current circuit breaker is configured such that the iron-core reactor 13 can be connected in series with the breaker 2 in order to improve the interruption performance. Installing the iron-core reactor 13 enables, the inductance to work within a given current range. Thus, it is possible to reduce the inclination of the magnitude of the current relative to time in a range near the current zero point. The iron-core reactors 13 may have a structure in which a gap is provided in the iron cores so that the current at which the inductance starts working can be adjusted, they are disposed in a distributed manner in the direct-current circuit breaker, and a shield to relax the electric field can be attached, and may be a winding iron core to function as a current transformer. As has been described above, the direct-current circuit breaker does not necessarily include the iron-core reactor 13. The iron-core reactor 13 may be eliminated as long as a desired performance can be realized without inserting the iron-core reactor 13 into the direct-current line 1.

Figure 11:
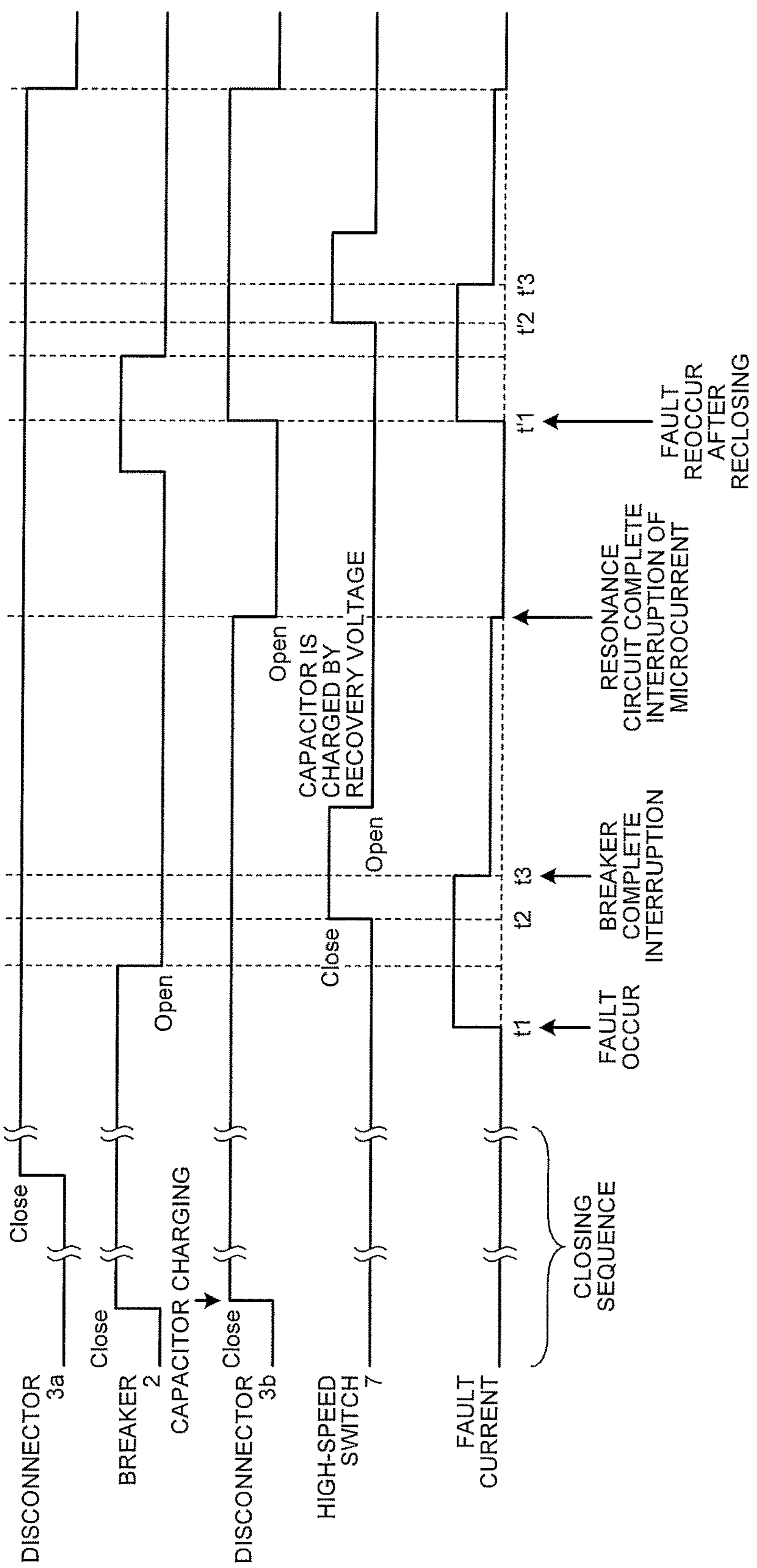
FIG. 11 is a timing chart illustrating an example of the operation timing of each unit in the direct-current circuit breaker when a high-speed reclosing operation is performed.
Figure 12:
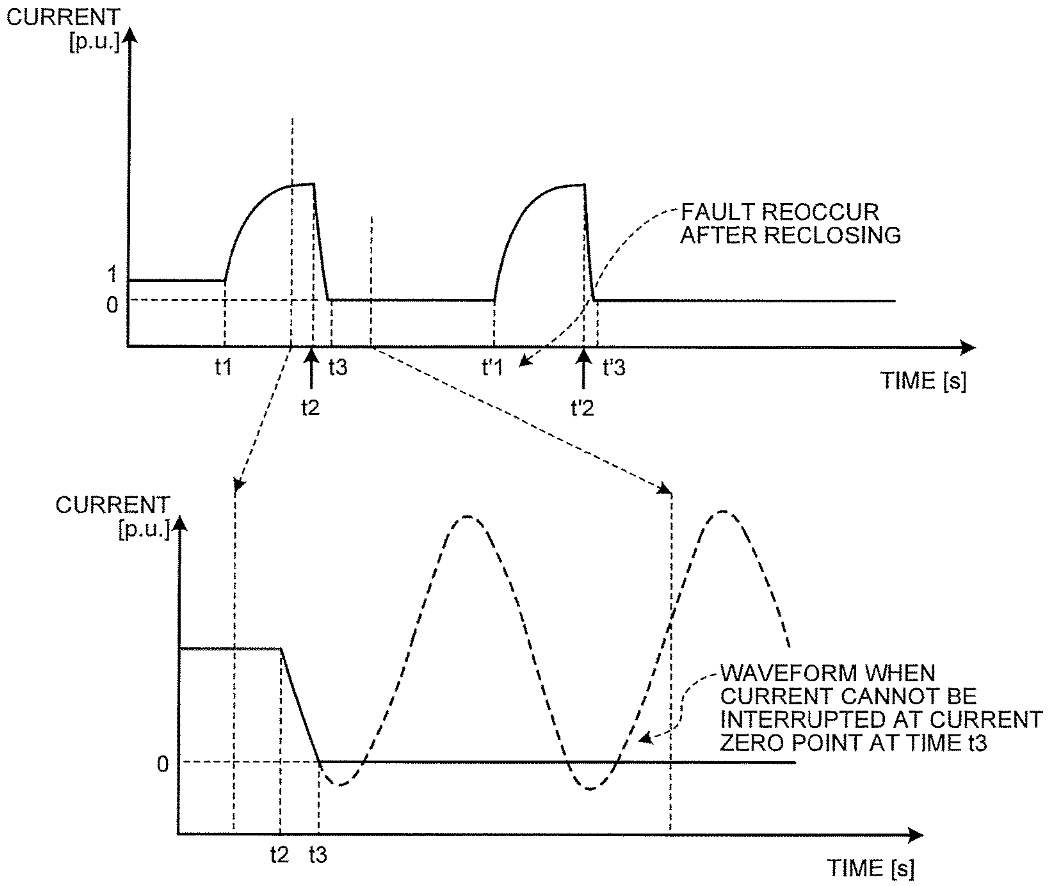
FIG. 12 is a diagram illustrating an example of a direct-current interruption operation when a high-speed reclosing operation is performed.

Charge is accumulated in the capacitor 5 of the resonance circuit 4 in accordance with the phase when the fault current is interrupted. With the use of the accumulated charge, the resonance current generated by the series circuit of the capacitor 5 and the reactor 6 in the resonance circuit 4 can be superimposed on the direct current flowing along the direct-current line 1 again. Thus, the direct-current circuit breaker can perform high-speed reclosing. Specifically, after the current is interrupted, the direct-current circuit breaker can be reclosed in a short period of time and can be then immediately opened. FIG. 11 illustrates a time chart corresponding to the operation in this case. FIG. 12 illustrates operation waveforms. As illustrated in FIG. 11, when a fault occurs at time t1, the direct-current circuit breaker closes the high-speed switch 7 at time t2 and opens the breaker 2. Then, after the fault current is reduced at time t3, the high-speed switch 7 is returned to the open state. As a result, the capacitor 5 stops discharging and starts charging. Thereafter, when the disconnector 3*a*, the breaker 2, and the disconnector 3*b* are operated such that they are reclosed and if a fault occurs again at time t'1, the high-speed switch 7 is closed at time t'2 and thus the breaker 2 can be completely opened without delay.

As described above, in the direct-current circuit breaker in the present embodiment, the resonance circuit 4 includes the series circuit that generates a resonance current to be superimposed on a fault current when a fault occurs; the high-speed switch 7 that is connected at one end to the capacitor 5 constituting the series circuit and is connected at the other end to the direct-current line 1; and the charging resistor 9 that is connected at one end to the connection point of the capacitor 5 and the high-speed switch 7 and is grounded at the other end. The capacitor 5 is charged with the direct-current potential of the direct-current line 1 by using the charging resistor 9. Consequently, it is possible, with a simple configuration, to obtain a circuit for charging the capacitor 5 of the series circuit, which can reduce the size and cost of the direct-current circuit breaker. Moreover, because the disconnector 3*a* or the disconnector 3*b* is opened after the breaker 2 is opened, a microcurrent continuously flowing along the direct-current line 1 via the resonance circuit 4 can be interrupted; therefore, the interruption performance can be improved. Furthermore, when the high-speed switch 7 is closed, a movable electrode is stopped at a position at which it is not in contact with a stationary electrode and the stationary electrode and the movable electrode are electrically connected by causing a discharge across the gap therebetween; therefore, the electrodes can be prevented from wearing and thus the durability of the electrodes can be improved.

Second Embodiment

Figure 13:
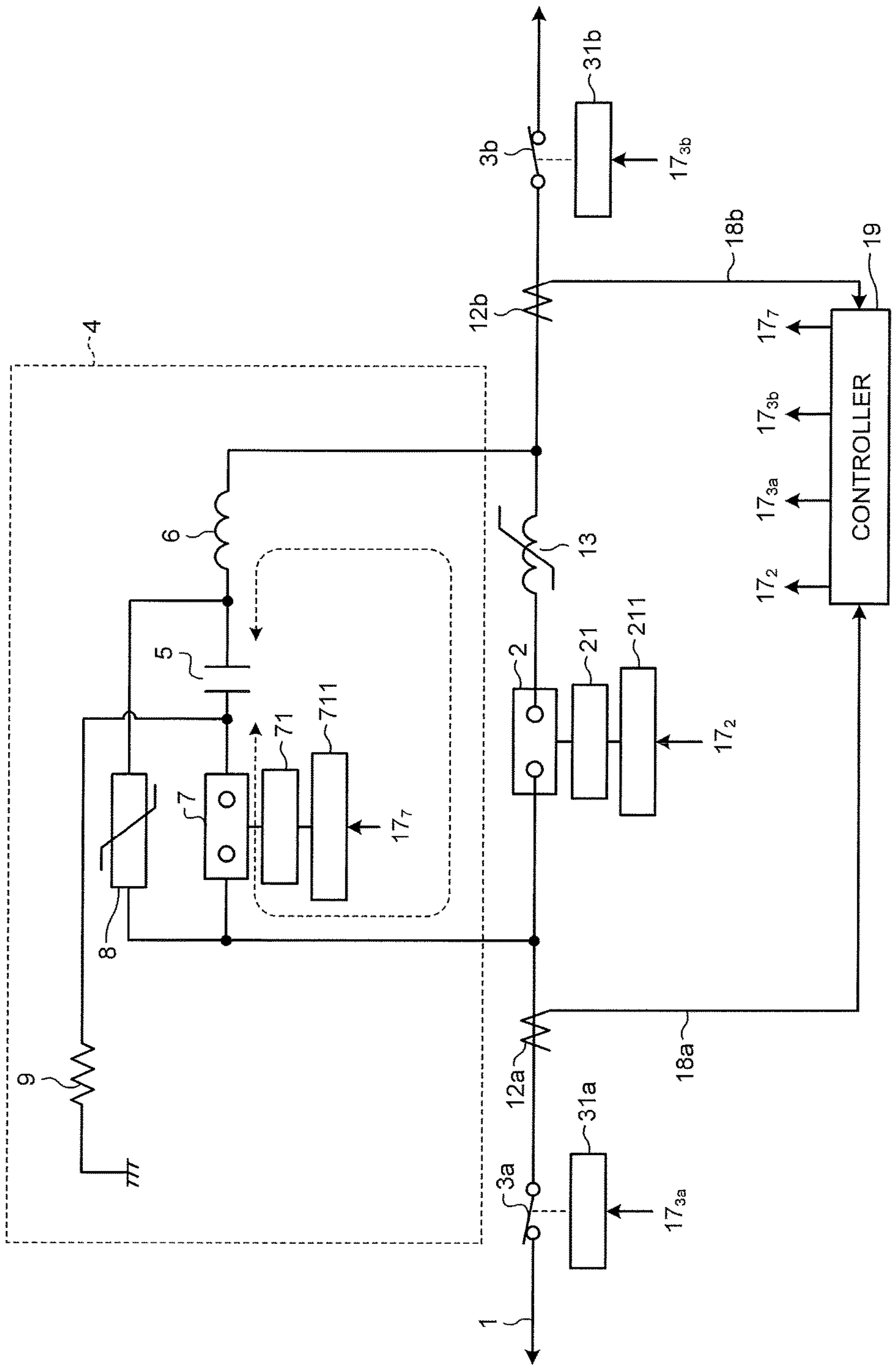
FIG. 13 is a diagram illustrating an example configuration of a direct-current circuit breaker according to a second embodiment.

In the direct-current circuit breaker according to the first embodiment illustrated in FIG. 1, a controller, which is not illustrated in FIG. 1, controls the breaker 2, the high-speed switch 7, and the disconnectors 3*a* and 3*b*. FIG. 13 is a diagram illustrating an example configuration of a direct-current circuit breaker that includes the controller. In FIG. 13, components common to the direct-current circuit breaker described in the first embodiment are given the same reference numerals. Only the parts different from those of the first embodiment will be explained.

The direct-current circuit breaker illustrated in FIG. 13 includes current transformers 12*a* and 12*b*, a controller 19, operating devices 21, 31*a*, 31*b*, and 71, and drive control boards 211 and 711 in addition to the components of the direct-current circuit breaker illustrated in FIG. 1.

In the direct-current circuit breaker illustrated in FIG. 13, the controller 19 controls the breaker 2, the disconnectors 3*a* and 3*b*, and the resonance circuit 4. Moreover, the controller 19 detects a fault on the basis of the current detection value detected by the current transformer 12*a* and the current detection value detected by the current transformer 12*b*. A component other than the controller 19 may be assigned to detect a fault on the basis of the current detection value detected by the current transformer 12*a* and the current detection value detected by the current transformer 12*b*. For example, a fault detector may be additionally provided that detects a fault on the basis of the current detection value detected by the current transformer 12*a* and the current detection value detected by the current transformer 12*b*. When the fault detector detects a fault, the fault detector may notify the controller 19 of the details of the fault.

The operating device 21 is connected to the breaker 2 and the drive control board 211 is connected to the operating device 21. When the drive control board 211 receives a switching control signal $17_2$ from the controller 19, the drive control board 211 drives the operating device 21 in accordance with the details of the instruction indicated by the switching control signal $17_2$ such that the breaker 2 is caused to open or close. The operating devices 31*a* and 31*b* are connected to the disconnectors 3*a* and 3*b*, respectively.

When the operating device 31*a* receives a switching control signal $\mathbf{17}_{3a}$ from the controller 19, the operating device 31*a* causes the disconnector 3*a* to open or close in accordance with the details of the instruction indicated by the switching control signal $\mathbf{17}_{3a}$. When the operating device 31*b* receives a switching control signal $\mathbf{17}_{3b}$ from the controller 19, the operating device 31*b* causes the disconnector 3*b* to open or close in accordance with the details of the instruction indicated by the switching control signal $\mathbf{17}_{3b}$. The disconnectors 3*a* and 3*b* have a microcurrent interrupting function in order to interrupt a microcurrent flowing along the direct-current line 1 via the resonance circuit 4 after the breaker 2 interrupts the current.

An example operation of interrupting a direct current when the resonance current of opposite polarity is superimposed on the direct current flowing in the direct-current circuit breaker according to the present embodiment is as illustrated in FIG. 2, which is the case described in the first embodiment. An example of the timing chart illustrating an example of the operation timing of each unit in the direct-current circuit breaker when a fault occurs is as illustrated in FIG. 3, which is the case described in the first embodiment.

For example, at time t1 illustrated in FIG. 2, if a fault occurs in the direct-current line 1 illustrated in FIG. 13, as described in the first embodiment, a fault current that is a few times the current when in a steady state (1 p.u.) flows along the direct-current line 1. It is assumed that the capacitor 5 is fully charged at time t1. In this case, the controller 19 detects a fault on the basis of detection signals 18*a* and 18*b* detected by the current transformers 12*a* and 12*b* and the detection signal detected by, for example, a transformer that is present on the direct-current line 1 but is not illustrated in the drawings. When the controller 19 detects a fault, the controller 19 outputs the switching control signals $\mathbf{17}_2$, $\mathbf{17}_{3a}$, $\mathbf{17}_{3b}$, and $\mathbf{17}_7$ to the breaker 2, the disconnectors 3*a* and 3*b*, and the high-speed switch 7 to instruct them to perform operations.

Specifically, when the controller 19 detects a fault, the controller 19 first instructs the drive control board 211 to cause the breaker 2 to open. The drive control board 211 that has received the instruction controls the operating device 21 such that it starts an opening operation of the breaker 2. Then, at time t2, the controller 19 transmits, to the drive control board 711, an instruction to close the high-speed switch 7. The drive control board 711 that has received the instruction to close the high-speed switch 7 controls the operating device 71 such that it closes the high-speed switch 7. As a result, the capacitor 5 starts discharging the charge and, as illustrated by a broken line, the resonance current flows around the loop made up of the capacitor 5, the reactor 6, the breaker 2, and the high-speed switch 7. This resonance current is superimposed on the fault current flowing along the direct-current line 1, whereby a current zero point is created at time t3 illustrated in FIG. 2. Consequently, an arc between the electrodes of the breaker 2 is extinguished and thus the current is interrupted.

As described in the first embodiment, when interruption of the fault current by the breaker 2 is completed, the fault current changes the path such that it flows to the resonance circuit 4 and is limited by the arrester 8. However, a microcurrent continues to flow along the direct-current line 1. Thus, when the microcurrent flows along the direct-current line 1, the controller 19, for example, instructs the operating device 31*b* to open the disconnector 3*b* so as to remove the microcurrent. The operating device 31*b* that has received this instruction opens the disconnector 3*b* so that the microcurrent is interrupted. The controller 19 may interrupt a microcurrent by instructing the operating device 31*a* to open the disconnector 3*a* or by instructing both the operating devices 31*a* and 31*b* to open the disconnector 3*a* and the disconnector 3*b*.

The fault current that flows along the direct-current line 1 and the microcurrent that flows along the direct-current line 1 after the fault current changes the path such that it flows to the resonance circuit 4 are detected by the current transformers 12*a* and 12*b*. Examples of the current transformers 12*a* and 12*b* include a zero-flux current transformer, a Rogowski current transformer, a Hall-element-type current transformer, a flux-gate current transformer, and an optical current transformer. When the current transformers 12*a* and 12*b* are Rogowski current transformers, they output voltages by differentiating currents; therefore, output signals with a good response can be obtained. Furthermore, actual current waveforms can also be output by using an integration circuit. The controller 19 determines the presence or absence of a fault on the basis of the detection signals output from the current transformers 12*a* and 12*b*. When the controller 19 detects a fault, the controller 19 outputs a switching control signal to each of the operating devices for the breaker 2, the disconnectors 3*a* and 3*b*, and the high-speed switch 7. The operating devices that have received the switching control signals, which are the operating device 31*a* for the disconnector 3*a*, the operating device 31*b* for the disconnector 3*b*, the operating device 21 for the breaker 2, and the operating device 71 for the high-speed switch 7, perform the interruption operation illustrated in FIG. 2 and FIG. 3 in accordance with the switching control signals.

The operating device 31*a*, the operating device 31*b*, the operating device 21, and the operating device 71 described above are mechanical operating devices. For example, they are a motor-type operating device, a spring-type operating device, an electromagnetic-coil-type operating device, or the like. However, all of the operating devices are not necessarily of the same type and operating devices of different types may be combined into one operating device. For example, an operating device can be used that uses an electromagnetic coil to close the open circuit and uses a spring to open the closed circuit.

An explanation has been given of an example operation when a ground fault occurs on the disconnector 3*b* side of the direct-current line 1; however, a fault current that flows when a ground fault occurs on the disconnector 3*a* side of the direct-current line 1 can also be interrupted by a similar control procedure. Specifically, when the controller 19 detects a ground fault that has occurred on the disconnector 3*a* side of the direct-current line 1, the controller 19 instructs the drive control board 211 to open the breaker 2 and moreover instructs the drive control board 711 to close the high-speed switch 7. After the fault current completely changes the path such that it flows to the resonance circuit 4, the controller 19 instructs one or both of the operating devices 31*a* and 31*b* to open the disconnectors 3*a* and/or 3*b*.

In the present embodiment, the controller 19 monitors the presence or absence of the occurrence of a fault. When the controller 19 detects a fault, the controller 19 outputs switching control signals to control the breaker 2, the disconnectors 3*a* and 3*b*, and the high-speed switch 7; however, each of the operating devices 21, 31*a*, 31*b*, and 71 may monitor the presence or absence of the occurrence of a fault. Moreover, a measuring device installed on the line may monitor the presence or absence of the occurrence of a fault and notify the controller 19 of the monitored result.

Alternatively, the measuring device may notify each of the operating devices 21, 31*a*, 31*b*, and 71 of the monitored result.

The direct-current circuit breaker in the present embodiment can also obtain an effect similar to that obtained by the direct-current circuit breaker in the first embodiment. The resonance circuit 4 can be replaced by the resonance circuit 4*a* illustrated in FIG. 8 or the resonance circuit 4*b* illustrated in FIG. 9.

Third Embodiment

Figure 14:
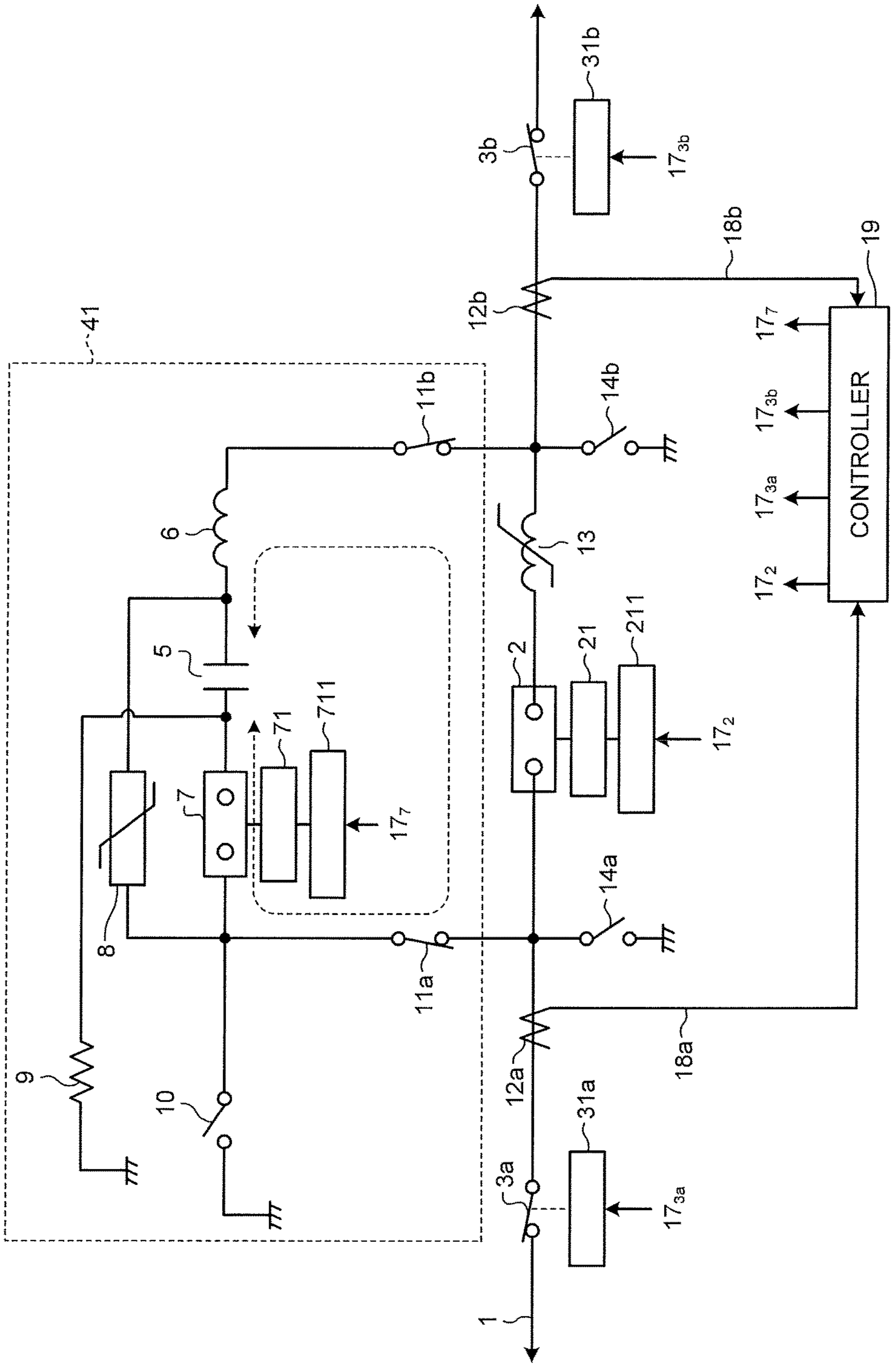
FIG. 14 is a diagram illustrating an example configuration of a direct-current circuit breaker according to a third embodiment.

FIG. 14 is a diagram illustrating an example configuration of a direct-current circuit breaker according to a third embodiment. Components common to the direct-current circuit breaker described in the second embodiment are given the same reference numerals. In the present embodiment, only the parts different from those of the second embodiment will be explained.

As illustrated in FIG. 14, the direct-current circuit breaker according to the present embodiment is obtained by adding grounding switches 10, 14*a*, and 14*b* and disconnectors 11*a* and 11*b* to the direct-current circuit breaker in the second embodiment. The grounding switch 10, the disconnector 11*a*, and the disconnector 11*b* constitute a resonance circuit 41. The direct-current circuit breaker according to the first embodiment illustrated in FIG. 1 can also include the grounding switches 10, 14*a*, and 14*b* and the disconnectors 11*a* and 11*b*.

The grounding switch 10 is a switch for discharging the residual charge in the resonance circuit 41 when a maintenance operation is performed on the resonance circuit 41. The grounding switch 10 is set to open during normal conditions during which the direct-current circuit breaker monitors the occurrence of a fault and interrupts a fault current when a fault occurs. The grounding switch 10 is set to closed during a maintenance operation of the resonance circuit 41.

The grounding switches 14*a* and 14*b* are switches for grounding the direct-current line 1. The grounding switches 14*a* and 14*b* are set to open during normal conditions and are set to closed during a maintenance operation.

The disconnectors 11*a* and 11*b* are provided to separate the resonance circuit 41 from the direct-current line 1. The disconnectors 11*a* and 11*b* are set to closed during normal conditions and are set to open during a maintenance operation of the resonance circuit 41.

The operation of the direct-current circuit breaker according to the present embodiment during normal conditions, i.e., the operation when the grounding switches 10, 14*a*, and 14*b* are set to open and the disconnectors 11*a* and 11*b* are set to closed, is similar to that of the direct-current circuit breaker in the second embodiment.

As described above, because the direct-current circuit breaker in the present embodiment includes the grounding switches 10, 14*a*, and 14*b* and the disconnectors 11*a* and 11*b*, the maintainability is improved and safety during a maintenance operation can be ensured.

Fourth Embodiment

Figure 15:
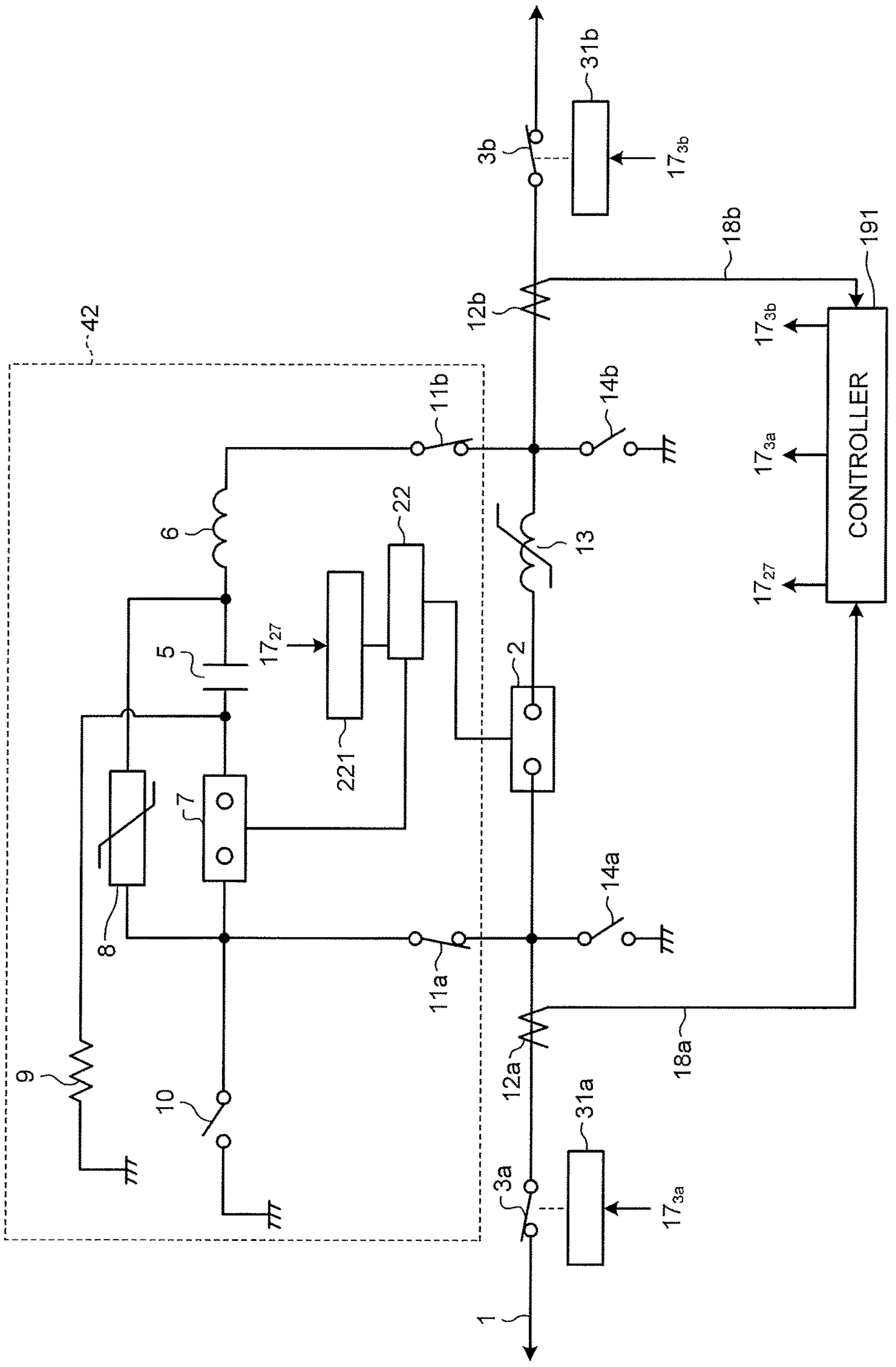
FIG. 15 is a diagram illustrating an example configuration of a direct-current circuit breaker according to a fourth embodiment.

FIG. 15 is a diagram illustrating an example configuration of a direct-current circuit breaker according to a fourth embodiment. Components common to the direct-current circuit breakers described in the first to third embodiments are given the same reference numerals. In the present embodiment, only the parts different from those of the first to third embodiments will be explained.

Figure 16:
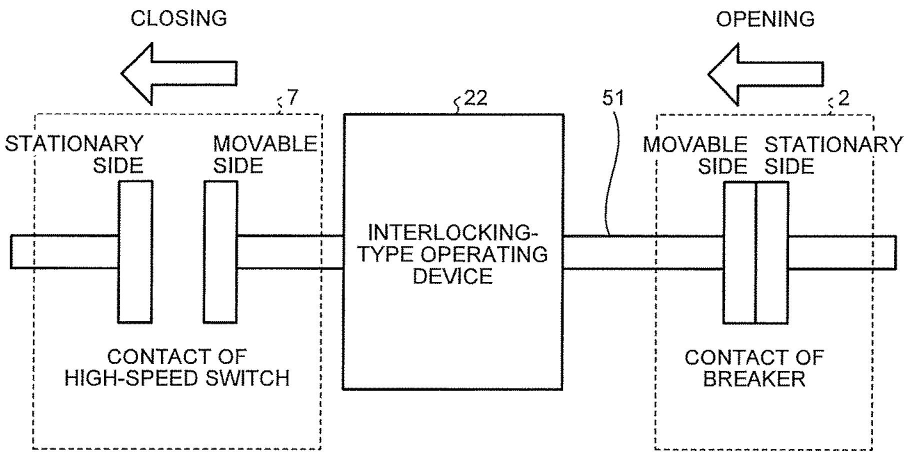
FIG. 16 is a conceptual diagram of an interlocking-type operating device, a breaker, and a high-speed switch.

As illustrated in FIG. 15, the direct-current circuit breaker according to the present embodiment is configured such that the resonance circuit 41 is replaced by a resonance circuit 42, in which the operating device 21 for the breaker 2 and the operating device 71 for the high-speed switch 7 described in the third embodiment are replaced by an interlocking-type operating device 22. Because the closing operation of the high-speed switch 7 and the opening operation of the breaker 2 are paired, the direct-current circuit breaker in the present embodiment operates the breaker 2 and the high-speed switch 7 in conjunction with each other by using one interlocking-type operating device 22. FIG. 16 is a conceptual diagram of the interlocking-type operating device 22, the breaker 2, and the high-speed switch 7. For example, when the breaker 2 is opened with the occurrence of a fault to interrupt a current, the high-speed switch 7 is closed. In contrast, when in a steady state, the breaker 2 is closed and the high-speed switch 7 is open. Thus, the interlocking-type operating device 22 operates the movable electrode of the breaker 2 and the movable electrode of the high-speed switch 7 at the same time. For example, as illustrated in FIG. 16, the movable electrode of the breaker 2 and the movable electrode of the high-speed switch 7 are connected to the respective opposite ends of the shaft 51 and the interlocking-type operating device 22 operates the shaft 51 so as to change the statuses of the breaker 2 and the high-speed switch 7 in conjunction with each other. By employing such a mechanism, the direct-current circuit breaker can be reduced in size and cost. When the configuration in the present embodiment is used, the high-speed switch 7 remains closed even after a fault current is completely interrupted. An explanation has been given of a case where the breaker 2 and the high-speed switch 7 are operated in conjunction with each other. However, if there is any other component, such as a switch, that can operate the breaker 2 and the high-speed switch 7 in conjunction with each other, a similar mechanism may be applied to this component so as to operate the breaker 2 and the high-speed switch 7 in conjunction with each other.

A drive control board 221 for driving the interlocking-type operating device 22 is connected to the interlocking-type operating device 22. A controller 191 corresponds to the controller 19 described in the second embodiment, and the controller 191 generates a switching control signal $\mathbf{17}_{27}$ for the drive control board 221, the switching control signal $\mathbf{17}_{3a}$ for the operating device 31*a*, and the switching control signal $\mathbf{17}_{3b}$ for the operating device 31*b*.

The method performed by the controller 191 of detecting a fault is similar to that performed by the controller 19 in the second embodiment. When the controller 191 outputs the switching control signals $\mathbf{17}_{27}$, $\mathbf{17}_{3a}$, and $\mathbf{17}_{3b}$ with the detection of a fault to open and close the breaker 2, the disconnectors 3*a* and 3*b*, and the high-speed switch 7, the controller 191 controls this operation with a timing that is similar to that in the second embodiment.

In the present embodiment, the direct-current circuit breaker according to the third embodiment is configured such that the operating device 21 for the breaker 2 and the operating device 71 for the high-speed switch 7 are replaced by the interlocking-type operating device 22. The operating device 21 for the breaker 2 and the operating device 71 for the high-speed switch 7 in the direct-current circuit breaker of the second embodiment can also be replaced by the interlocking-type operating device 22.

Fifth Embodiment

Figure 17:
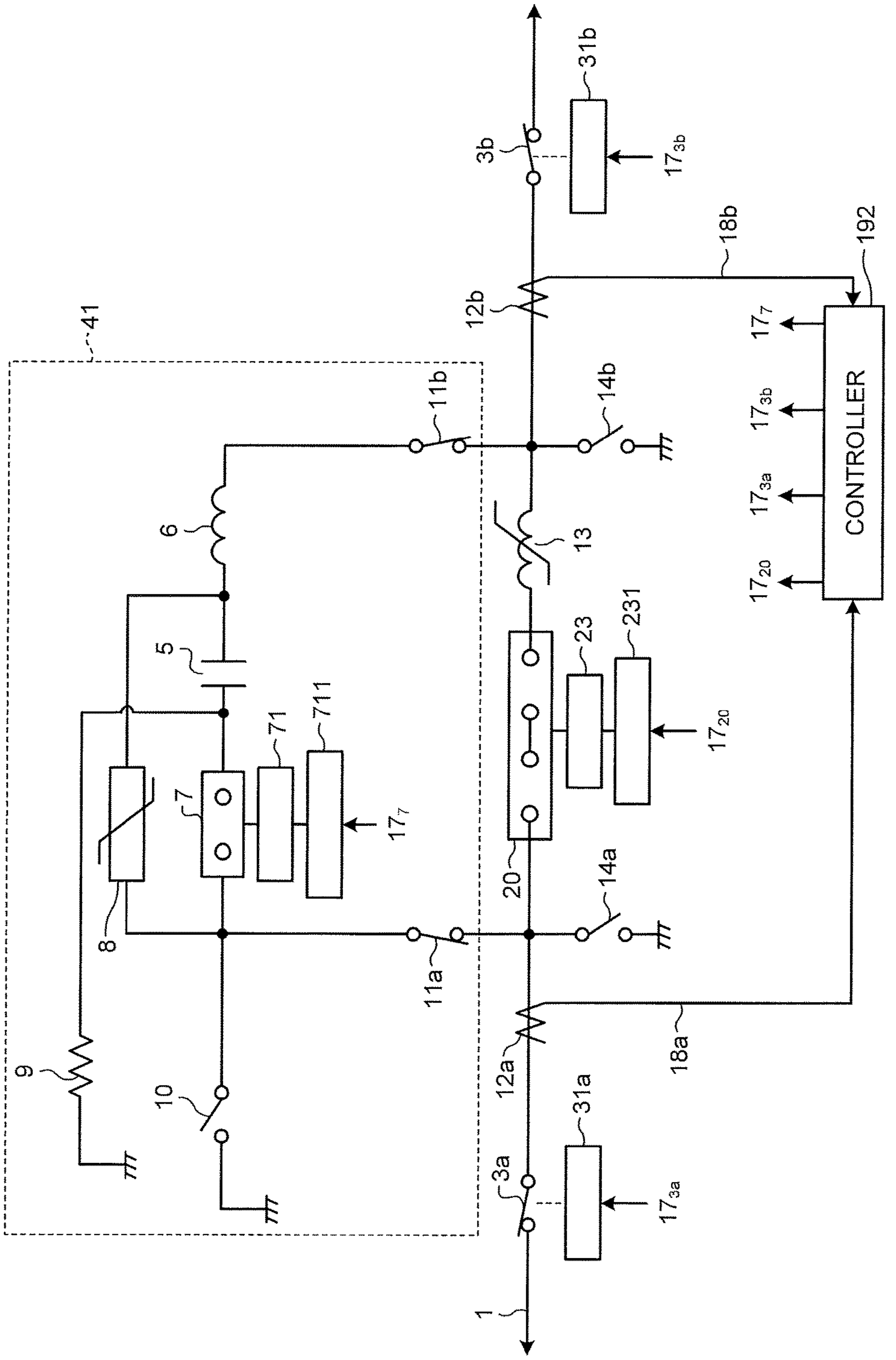
FIG. 17 is a diagram illustrating an example configuration of a direct-current circuit breaker according to a fifth embodiment.

FIG. 17 is a diagram illustrating an example configuration of a direct-current circuit breaker according to a fifth embodiment. Components common to the direct-current circuit breakers described in the first to third embodiments are given the same reference numerals. In the present embodiment, only the parts different from those of the first to third embodiments will be explained.

As illustrated in FIG. 17, the direct-current circuit breaker according to the present embodiment is configured such that the breaker 2, the operating device 21, the drive control board 211, and the controller 19 described in the third embodiment are replaced by a breaker 20, an operating device 23, a drive control board 231, and a controller 192.

The breaker 20 is configured to have two contacts, i.e., the breaker 20 has an improved interruption performance compared to the breaker 2, which has only one contact. The breaker 20 may have three or more contacts so as to have a further improved interruption performance.

The drive control board 231 drives the operating device 23 and the operating device 23 opens and closes the breaker 20. The controller 192 corresponds to the controller 19 described in the first embodiment. The controller 192 generates a switching control signal $\mathbf{17}_{20}$ for the drive control board 231, the switching control signal $\mathbf{17}_{3a}$ for the operating device 31*a*, the switching control signal $\mathbf{17}_{3b}$ for the operating device 31*b*, and the switching control signal $\mathbf{17}_{7}$ for the drive control board 711.

The method performed by the controller 192 of detecting a fault is similar to that performed by the controller 19 in the second embodiment. When the controller 192 outputs the switching control signals $\mathbf{17}_{20}$, $\mathbf{17}_{3a}$, $\mathbf{17}_{3b}$, and $\mathbf{17}_{7}$ with the detection of a fault to open and close the breaker 20, the disconnectors 3*a* and 3*b*, and the high-speed switch 7, the controller 192 controls this operation with a timing that is similar to that in the second embodiment. The control timing of the breaker 20 is similar to the control timing of the breaker 2.

In the present embodiment, the breaker 2 of the direct-current circuit breaker according to the third embodiment is replaced by the breaker 20. The breaker 2 of the direct-current circuit breaker according to the first, second, or fourth embodiment can also be replaced by the breaker 20.

Sixth Embodiment

Figure 18:
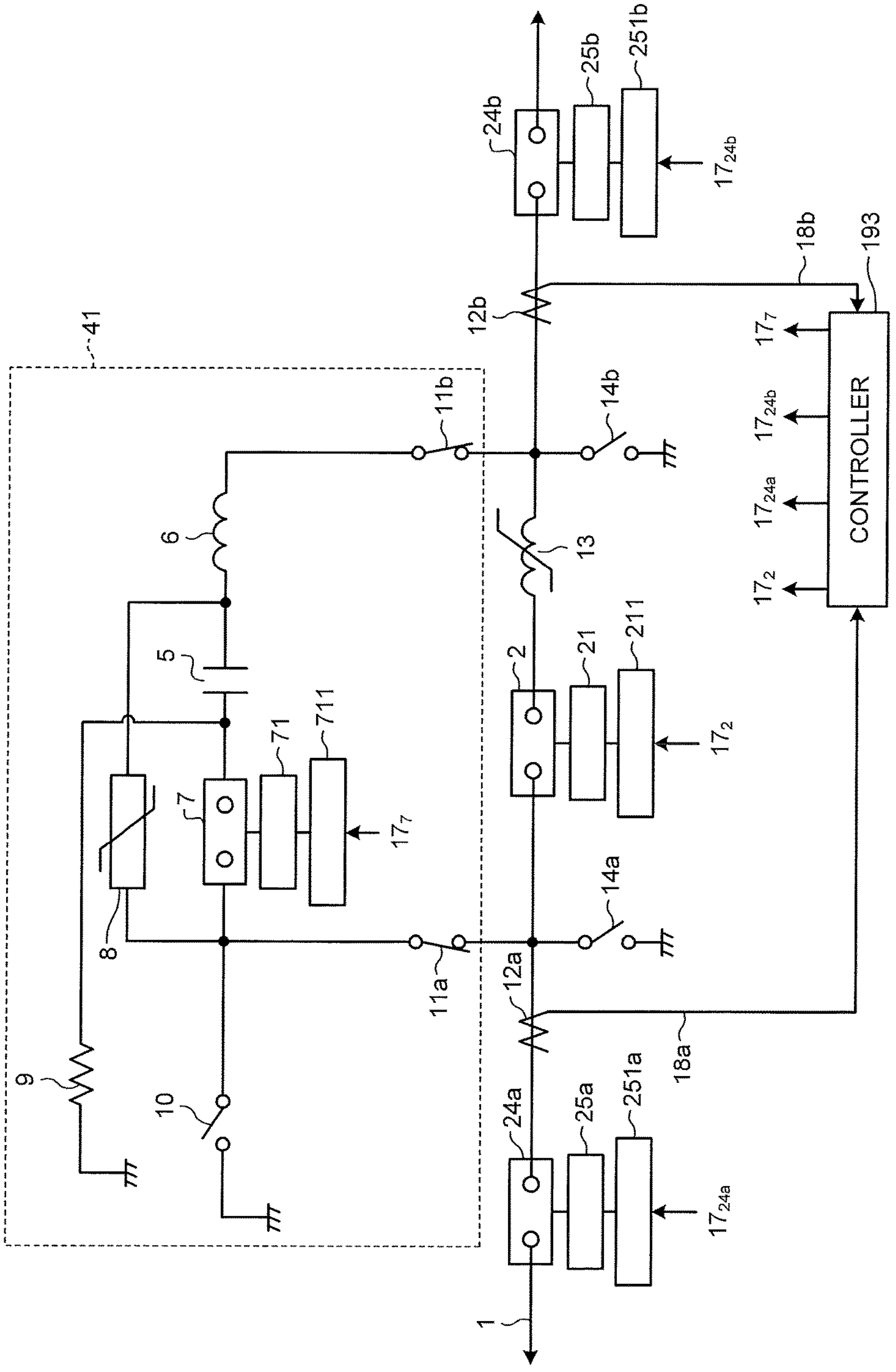
FIG. 18 is a diagram illustrating an example configuration of a direct-current circuit breaker according to a sixth embodiment.

FIG. 18 is a diagram illustrating an example configuration of a direct-current circuit breaker according to a sixth embodiment. Components common to the direct-current circuit breakers described in the first to third embodiments are given the same reference numerals. In the present embodiment, only the parts different from those of the first to third embodiments will be explained.

As illustrated in FIG. 18, the direct-current circuit breaker according to the present embodiment is configured such that the disconnectors 3*a* and 3*b*, the operating devices 31*a* and 31*b*, and the controller 19 described in the first and second embodiments are replaced by breakers 24*a* and 24*b*, operating devices 25*a* and 25*b*, drive control boards 251*a* and 251*b*, and a controller 193.

The breakers 24*a* and 24*b* are assigned to interrupt a microcurrent that continues to flow along the direct-current line 1 after a fault current is interrupted by opening the breaker 2 when a fault occurs. The disconnectors 3*a* and 3*b* included in the direct-current circuit breakers in the first to third embodiments are replaced by the breakers 24*a* and 24*b*; therefore, a high-speed switching operation can be performed and the reliability can be improved.

The drive control board 251*a* drives the operating device 25*a* and the operating device 25*a* opens and closes the breaker 24*a*. The drive control board 251*b* drives the operating device 25*b* and the operating device 25*b* opens and closes the breaker 24*b*. The controller 193 corresponds to the controller 19 described in the first embodiment. The controller 193 generates the switching control signal $\mathbf{17}_{2}$ for the drive control board 211, a switching control signal $\mathbf{17}_{24a}$ for the drive control board 251*a*, a switching control signal $\mathbf{17}_{24b}$ for the drive control board 251*b*, and the switching control signal $\mathbf{17}_{7}$ for the drive control board 711.

The method performed by the controller 193 of detecting a fault is similar to that performed by the controller 19 in the second embodiment. When the controller 193 outputs the switching control signals $\mathbf{17}_{2}$, $\mathbf{17}_{24a}$, $\mathbf{17}_{24b}$, and $\mathbf{17}_{7}$ with the detection of a fault to open and close the breakers 2, 24*a*, and 24*b* and the high-speed switch 7, the controller 193 controls this operation with a timing that is similar to that in the second embodiment. The control timing of the breaker 24*a* is similar to the control timing of the disconnector 3*a*. The control timing of the breaker 24*b* is similar to the control timing of the disconnector 3*b*.

In the present embodiment, an explanation has been given of a case where the disconnectors 3*a* and 3*b* of the direct-current circuit breaker according to the third embodiment are replaced by the breakers 24*a* and 24*b*. The disconnectors 3*a* and 3*b* of the direct-current circuit breaker according to the first, second, fourth, or fifth embodiment can also be replaced by the breakers 24*a* and 24*b*.

Seventh Embodiment

Figure 19:
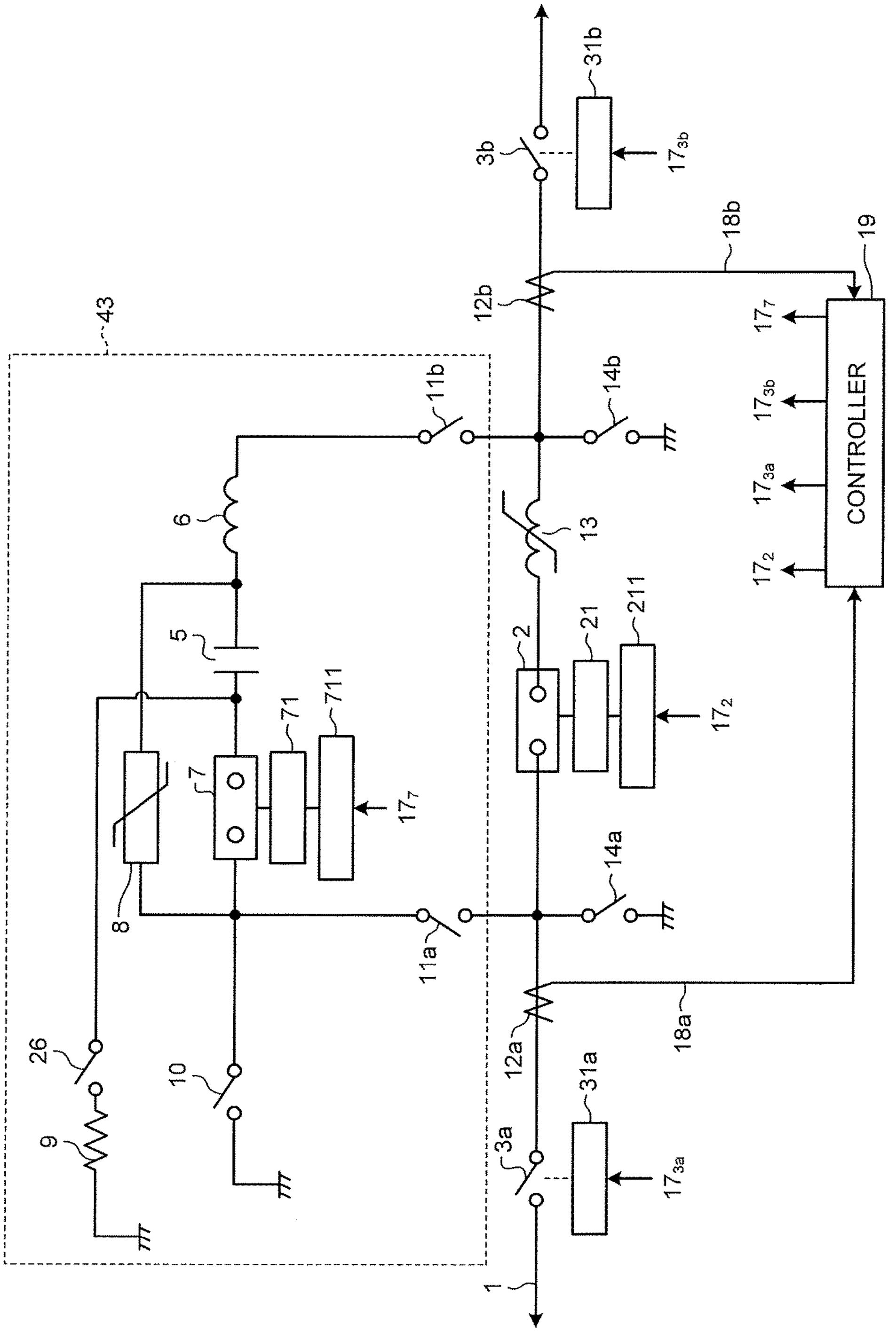
FIG. 19 is a diagram illustrating an example configuration of a direct-current circuit breaker according to a seventh embodiment.

FIG. 19 is a diagram illustrating an example configuration of a direct-current circuit breaker according to a seventh embodiment. Components common to the direct-current circuit breakers described in the first to third embodiments are given the same reference numerals. In the present embodiment, only the parts different from those of the first to third embodiments will be explained.

As illustrated in FIG. 19, the direct-current circuit breaker according to the present embodiment is configured such that the resonance circuit 41 of the direct-current circuit breaker described in the third embodiment is replaced by a resonance circuit 43. The resonance circuit 43 is obtained by adding a charging resistance switch 26 to the resonance circuit 41 described in the third embodiment. The charging resistance switch 26 is connected in series with the charging resistor 9. In the example illustrated in FIG. 19, the charging resistance switch 26 is connected at one end to the connection point of the capacitor 5 and the reactor 6 in the series resonance circuit and is connected at the other end to the charging resistor 9.

The direct-current circuit breaker in the present embodiment includes the charging resistance switch 26 and thus obtains the following effect. When the insulation of one pole line of the direct-current line 1 having a bipolar configuration breaks down and a normal-pole-side line generates an overvoltage, the charging resistance switch 26 is opened, thereby preventing the capacitor 5 from being overcharged. In other words, the reliability of the direct-current circuit breaker can be improved. This point will be explained in detail with reference to FIG. 20.

Figure 20:
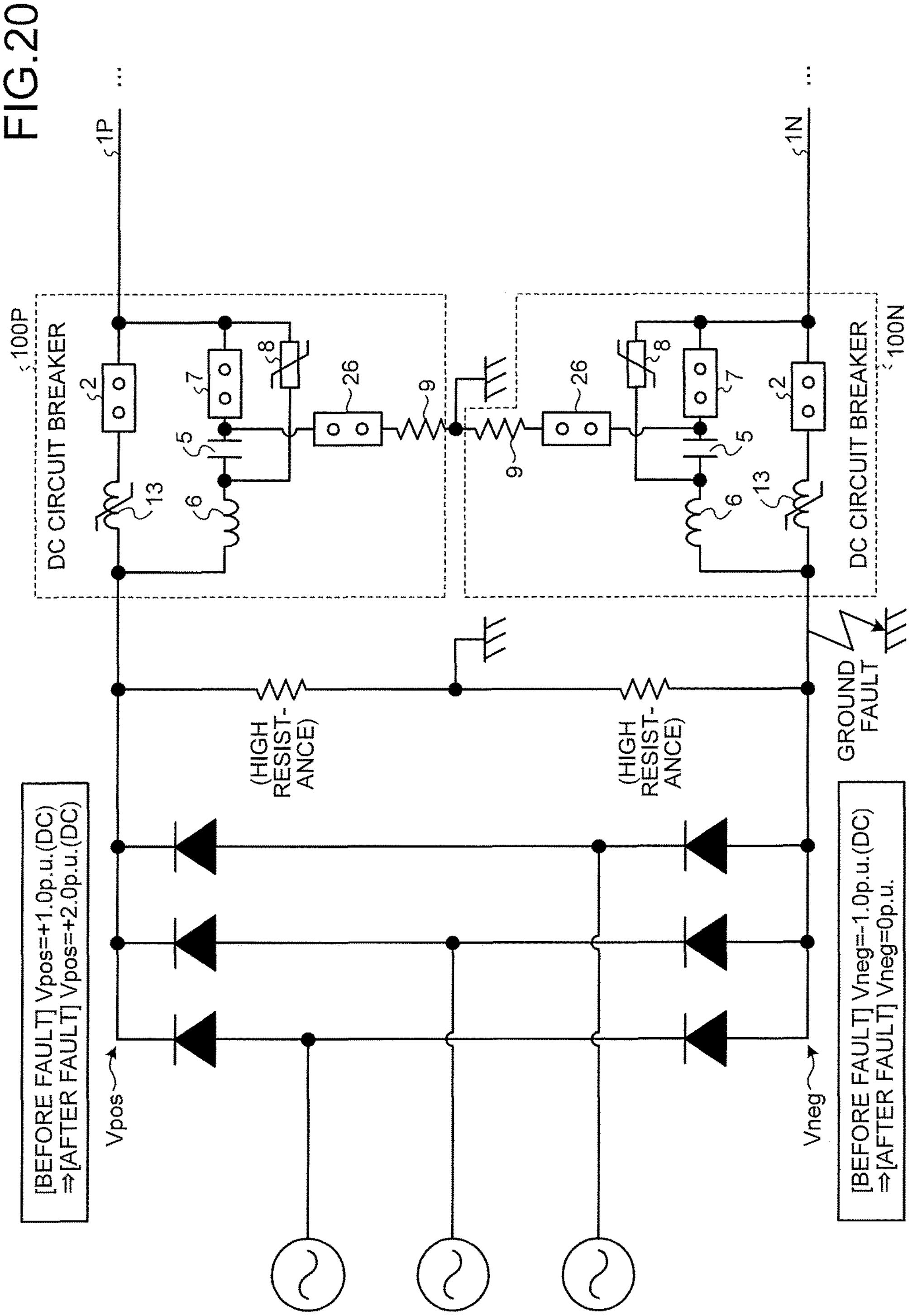
FIG. 20 is a diagram illustrating an example where the direct-current circuit breaker according to the seventh embodiment is applied to a system.

FIG. 20 is a diagram illustrating an example where the direct-current circuit breaker according to the seventh embodiment is applied to a system. In FIG. 20, some of the components of the direct-current circuit breaker are not illustrated. FIG. 20 illustrates an example when the direct-current circuit breaker of the present embodiment is applied to the system in which a neutral point is not grounded and illustrates direct-current circuit breakers 100P and 100N, which are the direct-current circuit breakers in the present embodiment. The direct-current circuit breaker 100P is inserted into a direct-current line 1P and the direct-current circuit breaker 100N is inserted into a direct-current line 1N.

It is assumed that the voltage Vpos of the direct-current line 1P is +1.0 p.u. and the voltage Vneg of the direct-current line 1N is −1.0 p.u. before a fault occurs. In this state, as illustrated in FIG. 20, a case is considered where a ground fault occurs in the direct-current line 1N. Even if a ground fault occurs, the potential difference between the direct-current lines 1P and 1N does not change. Thus, when a ground fault occurs in the direct-current line 1N, the voltage Vneg of the direct-current line 1N becomes 0 p.u. and the voltage Vpos of the direct-current line 1P becomes +2.0 p.u. In this case, because the voltage of +2.0 p.u. is applied to the capacitor 5 of the direct-current circuit breaker 100P, the capacitor 5 is overcharged up to +2.0 p.u. However, because the direct-current circuit breaker 100P includes the charging resistance switch 26, the capacitor 5 can be prevented from being overcharged by opening the charging resistance switch 26. Therefore, the capacitor 5 can be prevented from being broken.

For example, the controller 19 controls opening and closing of the charging resistance switch 26. The controller 19 monitors the voltage of the direct-current line. When the voltage exceeds a threshold, the controller 19 controls the charging resistance switch 26 such that it is open so as to stop charging the capacitor 5.

When the controller 19 outputs the switching control signals $\mathbf{17}_2$, $\mathbf{17}_{3a}$, $\mathbf{17}_{3b}$, and $\mathbf{17}_7$ with the detection of a fault to open and close the breaker 2, the disconnectors 3*a* and 3*b*, and the high-speed switch 7, the controller 19 controls this operation with a timing that is similar to that in the second embodiment.

In the present embodiment, an explanation has been given of a case where the charging resistance switch 26 is added to the direct-current circuit breaker according to third embodiment; however, the charging resistance switch 26 can also be added to the direct-current circuit breaker according to the first, second, fourth, fifth, or sixth embodiment.

The configurations described in the above embodiments are examples of the content of the present invention, and they can be combined with other publicly know technologies or part of them can be omitted or changed without departing from the scope of the present invention.

REFERENCE SIGNS LIST

1, 1N, 1P direct-current line, 2, 20, 24*a*, 24*b* breaker, 3*a*, 3*b*, 11*a*, 11*b*, 16 disconnector, 4, 4*a*, 4*b*, 41, 42, 43 resonance circuit, 5 capacitor, 6 reactor, 7 high-speed switch, 8 arrester, 9 charging resistor, 10, 14*a*, 14*b* grounding switch, 12*a*, 12*b* current transformer, iron-core reactor, 19, 191, 192, 193 controller, 21, 23, 25*a*, 25*b*, 31*a*, 31*b*, 71 operating device, 22 interlocking-type operating device, 26 charging resistance switch, 100P, 100N direct-current circuit breaker, 211, 221, 231, 251*a*, 251*b*, 711 drive control board.

The invention claimed is:

1. A direct-current circuit breaker that creates a current zero point by superimposing a resonance current on a direct current flowing along a direct-current line and interrupts the direct current at the current zero point, the direct-current circuit breaker comprising:

- a breaker that is inserted into the direct-current line and becomes a path for the direct current when in a steady state;
- a resonance circuit that is connected in parallel with the breaker and superimposes a resonance current on the direct current after the breaker is opened;
- a first disconnector that is connected at one end to a first connection point where the breaker and the resonance circuit are connected and that forms a path for the direct current together with the breaker when in a steady state; and
- a second disconnector that is connected at one end to a second connection point where the breaker and the resonance circuit are connected and that forms a path for the direct current together with the breaker and the first disconnector when in a steady state, wherein
- the resonance circuit includes
  - a series circuit that includes a capacitor and a reactor and generates the resonance current,
  - a charging resistor that is used for charging the capacitor with a direct-current potential of the direct-current line when in a steady state,
  - a high-speed switch that is connected in series with the series circuit on the capacitor side and superimposes the resonance current on the direct current after the breaker is opened, and
  - an arrester that is connected at one end to the first connection point and is connected at another end to a connection point where the capacitor and the reactor are connected, that is connected in parallel with the capacitor and the high-speed switch, and that limits a current flowing into the capacitor from the direct-current line.

2. The direct-current circuit breaker according to claim 1, wherein, after the direct current is interrupted by superimposing the resonance current on the direct current, at least one of the first disconnector and the second disconnector is opened.

3. The direct-current circuit breaker according to claim 1, wherein, when the high-speed switch is closed, the high-speed switch electrically connects a movable electrode and a stationary electrode by causing a discharge across a gap between the movable electrode and the stationary electrode that are maintained in a non-contact state.

4. The direct-current circuit breaker according to claim 1, wherein the charging resistor is connected at one end to a connection point where the capacitor and the high-speed switch are connected and is grounded at another end.

5. The direct-current circuit breaker according to claim 1, wherein the resonance circuit includes a grounding switch for discharging a residual charge in the resonance circuit after the breaker is opened and a direct current flowing along the direct-current line is interrupted.

6. The direct-current circuit breaker according to claim 1, further comprising a Rogowski current transformer that is inserted into the direct-current line and is used for detecting a fault current.

7. The direct-current circuit breaker according to claim 1, wherein the breaker is a mechanical switch.

8. The direct-current circuit breaker according to claim 1, further comprising a spring-type operating device as an operating device for the breaker, an operating device for the first disconnector, and an operating device for the second disconnector.

9. The direct-current circuit breaker according to claim 1, further comprising an electromagnetic-coil-type operating device as an operating device for the breaker, an operating device for the first disconnector, and an operating device for the second disconnector.

10. The direct-current circuit breaker according to claim 1, further comprising an operating device having a configuration in which a closing operation method is different from an opening operation method as an operating device for the breaker, an operating device for the first disconnector, and an operating device for the second disconnector.

11. The direct-current circuit breaker according to claim 10, wherein the operating device has a configuration in which an operation method using an electromagnetic coil and an operation method using a spring are combined.

12. The direct-current circuit breaker according to claim 1, further comprising a controller that controls the breaker, the first disconnector, and the second disconnector, wherein, when the direct-current circuit breaker on the direct-current line is closed, the controller closes the breaker, then, closes one of the first disconnector and the second disconnector that is connected to the series circuit side so as to cause charging of the capacitor with a direct current flowing along the direct-current line to be started, and, after the capacitor is completely charged, closes another of the first disconnector and the second disconnector that is open.

13. The direct-current circuit breaker according to claim 1, wherein the breaker, the first disconnector, the second disconnector, and the high-speed switch are configured to include a vacuum valve.

14. The direct-current circuit breaker according to claim 1, wherein at least one of the breaker, the first disconnector, the second disconnector, and the high-speed switch is configured to include a vacuum valve and remaining of the breaker, the first disconnector, the second disconnector, and the high-speed switch is configured such that an insulating gas is enclosed.

15. The direct-current circuit breaker according to claim 1, wherein the series circuit that includes the capacitor and the reactor generates a resonance current with which a current zero point is able to be created in both of a case where a direction of a current flowing along the direct-current line is a first direction and a case where a direction of a current flowing along the direct-current line is a second direction, which is opposite to the first direction.

16. The direct-current circuit breaker according to claim 1, further comprising an iron-core reactor that is connected in series with the breaker and forms a path for the direct current when in a steady state.

17. The direct-current circuit breaker according to claim 1, further comprising a controller that controls the high-speed switch, wherein, after the high-speed switch is closed so as to superimpose the resonance current on the direct current, the controller opens the high-speed switch in a state where a voltage having a same polarity as an initial charging state remains in the capacitor.

18. The direct-current circuit breaker according to claim 1, further comprising a mechanism for moving a movable electrode of the breaker and a movable electrode of the high-speed switch at a same time, wherein one operating device performs switching control such that when the breaker is closed, the high-speed switch is opened at a same time, and, when the breaker is opened, the high-speed switch is closed at a same time.

19. The direct-current circuit breaker according to claim 1, wherein the breaker is configured such that a plurality of switches are connected in series with each other.

20. The direct-current circuit breaker according to claim 1, wherein the resonance circuit includes a switch that is connected in series with the charging resistor and is used for stopping charging of the capacitor when a charging voltage applied to the capacitor exceeds a threshold.

21. A direct-current circuit breaker that creates a current zero point by superimposing a resonance current on a direct current flowing along a direct-current line and interrupts the direct current at the current zero point, the direct-current circuit breaker comprising:

a first breaker that is inserted into the direct-current line and becomes a path for the direct current when in a steady state;

a resonance circuit that is connected in parallel with the first breaker and superimposes a resonance current on the direct current after the first breaker is opened;

a second breaker that is connected at one end to a first connection point where the first breaker and the resonance circuit are connected and that forms a path for the direct current together with the first breaker when in a steady state; and a third breaker that is connected at one end to a second connection point where the first breaker and the resonance circuit are connected and that forms a path for the direct current together with the first breaker and the second breaker when in a steady state, wherein the resonance circuit includes a series circuit that includes a capacitor and a reactor and generates the resonance current, a charging resistor that is used for charging the capacitor with a direct-current potential of the direct-current line when in a steady state, a high-speed switch that is connected in series with the series circuit on the capacitor side and superimposes the resonance current on the direct current after the first breaker is opened, and an arrester that is connected at one end to the first connection point and is connected at another end to a connection point where the capacitor and the reactor are connected, that is connected in parallel with the capacitor and the high-speed switch, and that limits a current flowing into the capacitor from the direct-current line, and the second breaker or the third breaker is opened after the direct current is interrupted by superimposing the resonance current on the direct current.

* * * * *